United States Patent
Xin et al.

(10) Patent No.: US 9,667,328 B2
(45) Date of Patent: May 30, 2017

(54) PRECODING MATRIX CODEBOOK DESIGN AND PERIODIC CHANNEL STATE INFORMATION FEEDBACK FOR ADVANCED WIRELESS COMMUNICATION SYSTEMS

(71) Applicant: Samsung Electronics Co., Ltd., Suwon-si, Gyeonggi-do (KR)

(72) Inventors: Yan Xin, Princeton, NJ (US); Young-Han Nam, Plano, TX (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 254 days.

(21) Appl. No.: 14/658,910

(22) Filed: Mar. 16, 2015

(65) Prior Publication Data

US 2015/0280801 A1 Oct. 1, 2015

Related U.S. Application Data

(60) Provisional application No. 61/973,088, filed on Mar. 31, 2014, provisional application No. 61/986,614, filed on Apr. 30, 2014.

(51) Int. Cl.
*H04B 7/04* (2006.01)
*H04B 7/06* (2006.01)
(Continued)

(52) U.S. Cl.
CPC ......... *H04B 7/0478* (2013.01); *H04B 7/0456* (2013.01); *H04B 7/0469* (2013.01);
(Continued)

(58) Field of Classification Search
CPC .. H04B 7/0456; H04B 7/0469; H04B 7/0478; H04B 7/0632; H04B 7/0639;
(Continued)

(56) References Cited

U.S. PATENT DOCUMENTS 8,913,682 B2    12/2014  Nam et al.
2013/0258964 A1 10/2013  Nam et al.
(Continued)

FOREIGN PATENT DOCUMENTS

EP    2 645 616 A2    10/2013
EP    2 665 203 A1    11/2013
(Continued)

OTHER PUBLICATIONS

3GPP TSG RAN WG1, "R1-134036 Final Report of 3GPP TSG RAN WG1 #74 v1.0.0", Oct. 7-11, 2013, 3GPP, 3GPP TSG RAN WG1 Meeting #74bis, pp. 37-39.*
(Continued)

*Primary Examiner* — Un C Cho
*Assistant Examiner* — Shah Rahman

(57) ABSTRACT

Channel quality indicator (CQI) and precoding feedback from a user equipment includes reporting of at least a first and a second precoding matrix indicator (PMI). First, second and third indices are determined based upon the first and the second PMI and third and fourth PMI and are employed to select the precoding matrix. The selected precoding matrix includes a first column comprising a first row partition and a second row partition, where the first row partition is a Kronecker product of at least first and second precoding vectors and the second row partition is a Kronecker product of a first term and a second term. The first term is a product of a co-phasing factor and the first precoding vector and the second term is the second precoding vector. The first precoding vector is selected from a first codebook and the second precoding vector is selected from a second codebook.

20 Claims, 10 Drawing Sheets

(51) Int. Cl.
*H04L 5/00* (2006.01)
*H04B 7/0456* (2017.01)

(52) U.S. Cl.
CPC ......... *H04B 7/0632* (2013.01); *H04B 7/0639* (2013.01); *H04B 7/0684* (2013.01); *H04L 5/00* (2013.01); *H04B 7/0473* (2013.01); *H04B 7/0621* (2013.01)

(58) Field of Classification Search
CPC .. H04B 7/0684; H04B 7/0621; H04B 7/0473; H04L 5/00
USPC .......................................................... 370/329
See application file for complete search history.

(56) References Cited

U.S. PATENT DOCUMENTS

| | | | |
|---|---|---|---|
| 2014/0079100 A1 | 3/2014 | Kim et al. | |
| 2014/0098689 A1* | 4/2014 | Lee | H04B 7/0469 370/252 |
| 2014/0177745 A1* | 6/2014 | Krishnamurthy | H04B 7/0413 375/267 |
| 2014/0192762 A1 | 7/2014 | Li et al. | |
| 2014/0301492 A1* | 10/2014 | Xin | H04B 7/0456 375/267 |
| 2014/0376652 A1* | 12/2014 | Sayana | H04B 7/0639 375/267 |
| 2015/0080046 A1 | 3/2015 | Liu et al. | |
| 2015/0358060 A1* | 12/2015 | Park | H04B 7/0473 370/329 |
| 2016/0050003 A1* | 2/2016 | Ko | H04B 7/0469 370/329 |
| 2016/0080058 A1* | 3/2016 | Kang | H04B 7/0617 370/329 |

FOREIGN PATENT DOCUMENTS

| | | |
|---|---|---|
| WO | WO 2013/024350 A2 | 2/2013 |
| WO | WO 2013/152490 A1 | 10/2013 |
| WO | WO 2014/464499 A1 | 3/2014 |

OTHER PUBLICATIONS

Nam et al., "Full-Dimension MIMO (FD-MIMO) for Next Generation Cellular Technology", Jun. 2013, IEEE Communication Magazine, pp. all.*
International Search Report dated Jun. 30, 2015 in connection with International Patent Application No. PCT/KR2015/003224, 4 pages.
Written Opinion of the International Searching Authority dated Jun. 30, 2015 in connection with International Patent Application No. PCT/KR2015/003224, 6 pages.

* cited by examiner

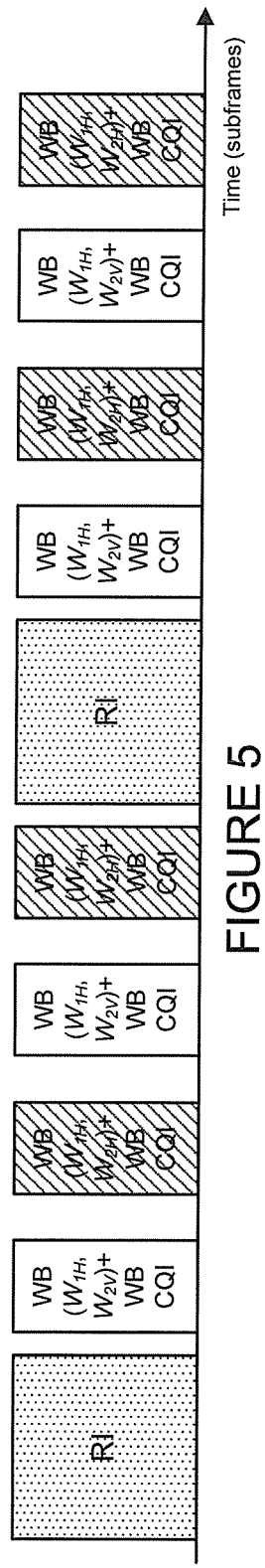
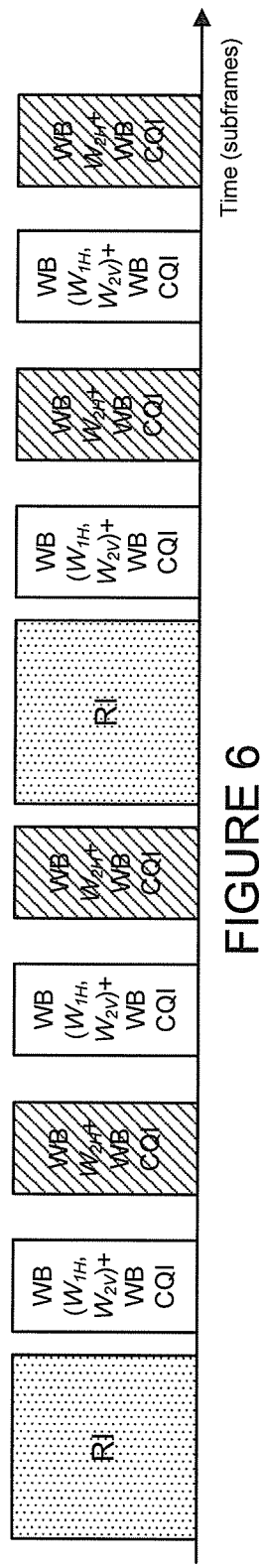
FIGURE 5
FIGURE 6

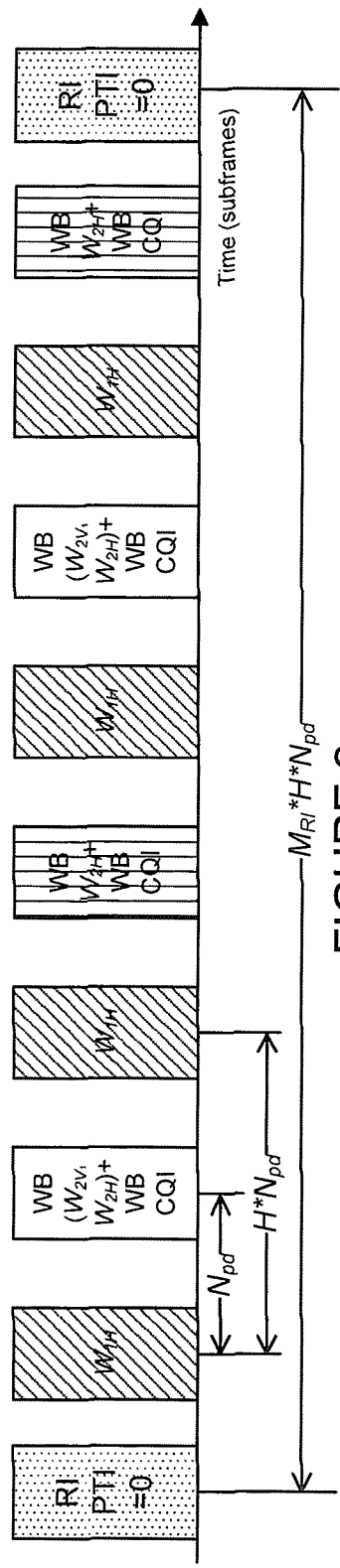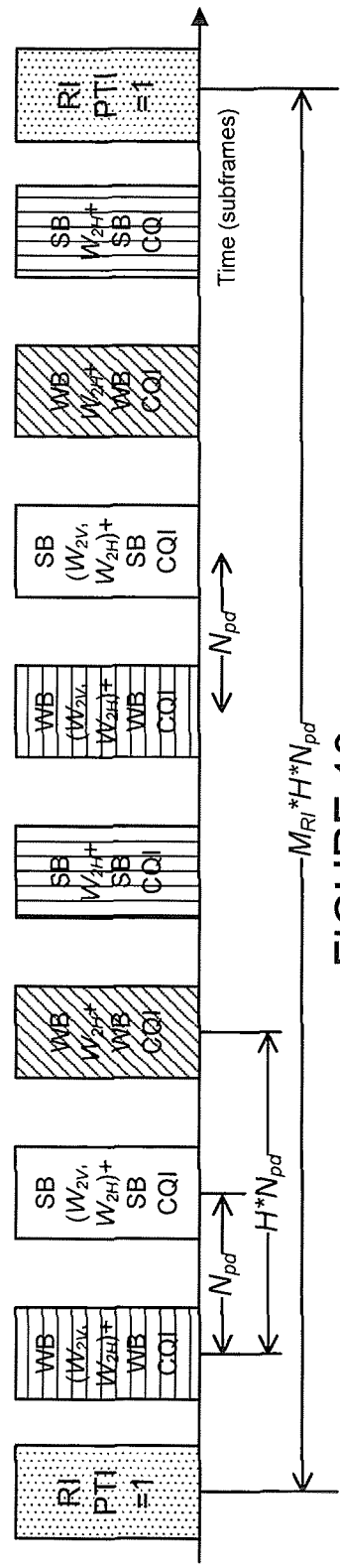
FIGURE 9
FIGURE 10

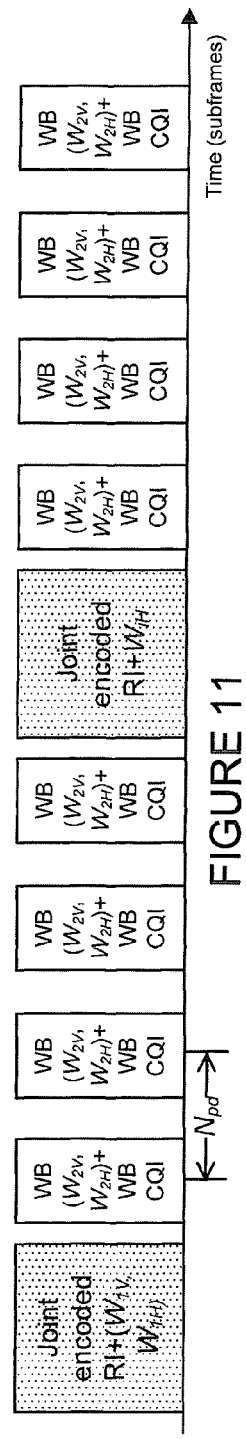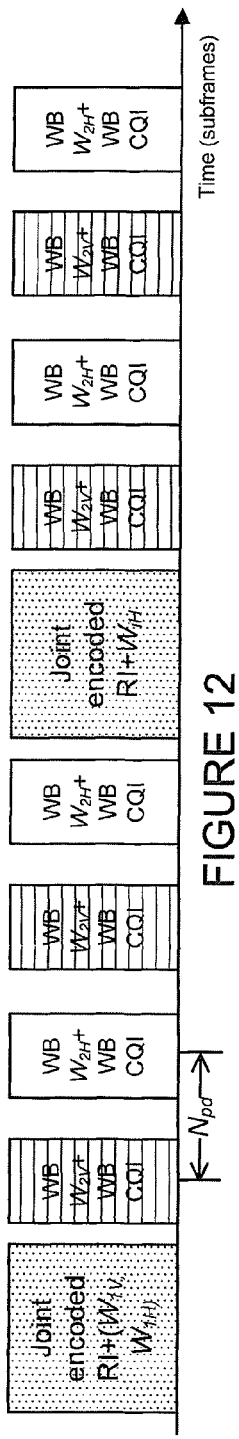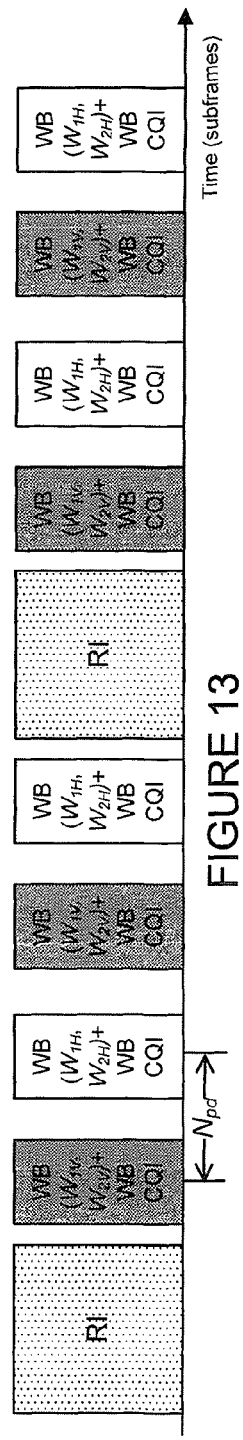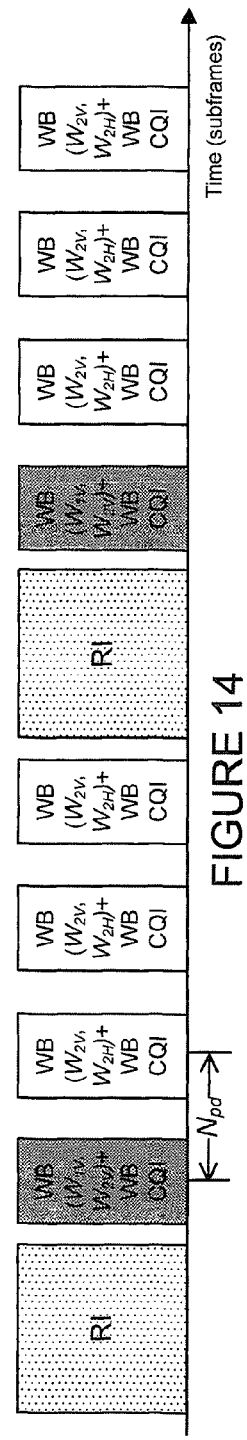
FIGURE 11
FIGURE 12
FIGURE 13
FIGURE 14

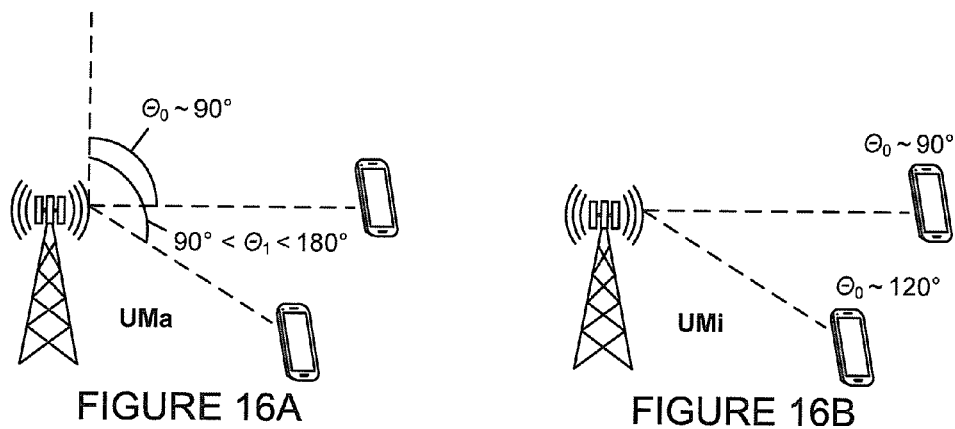
FIGURE 16A
FIGURE 16B
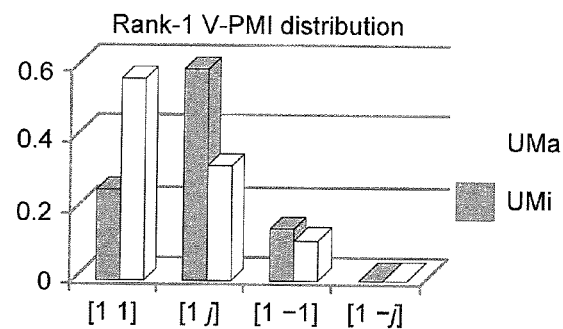
FIGURE 17
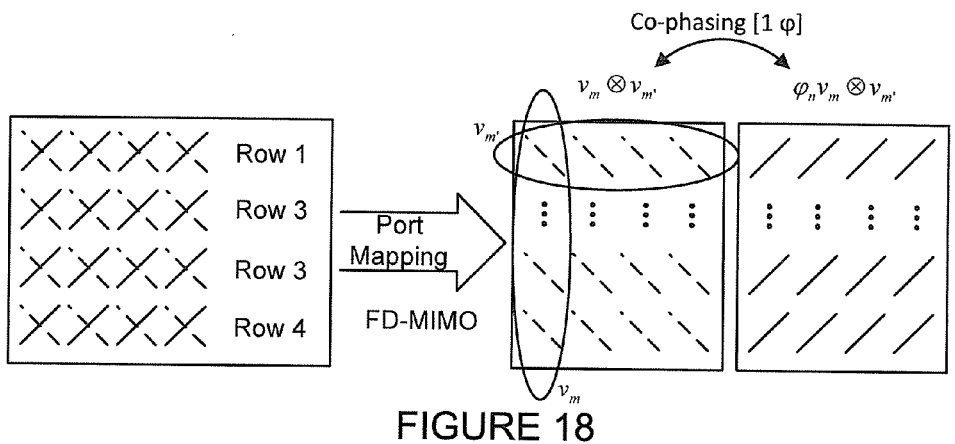
FIGURE 18

PRECODING MATRIX CODEBOOK DESIGN AND PERIODIC CHANNEL STATE INFORMATION FEEDBACK FOR ADVANCED WIRELESS COMMUNICATION SYSTEMS

This application claims priority to and hereby incorporates by reference U.S. Provisional Patent Application No. 61/973,088, filed Mar. 31, 2014, entitled "SYSTEMS AND METHODS FOR PUCCH FEEDBACK FOR ADVANCED WIRELESS COMMUNICATION SYSTEMS" and U.S. Provisional Patent Application No. 61/986,614, filed Apr. 30, 2014, entitled "PRECODING MATRIX CODEBOOK DESIGN AND PERIODIC CHANNEL STATE INFORMATION FEEDBACK FOR ADVANCED WIRELESS COMMUNICATION SYSTEMS."

TECHNICAL FIELD

The present disclosure relates generally to wireless communication systems with multiple antenna elements, and more specifically to periodic channel status information (CSI) feedback for use in a system with multiple active antenna elements arranged in a two-dimensional panel.

BACKGROUND

In frequency division, multiple input multiple output systems wireless communications systems, the user equipment needs to feedback not only a precoding matrix indicator for the azimuth domain (also called the horizontal domain) but also a precoding matrix indicator for the elevation domain (also called the vertical domain). On the other hand, to maintain good feedback reliability and coverage, physical uplink control channel quality information feedback designs are subject to payload size constraints.

There is, therefore, a need in the art for improved channel quality information feedback for frequency division, multiple input multiple output systems wireless communications systems.

SUMMARY

Channel quality indicator (CQI) and precoding feedback from a user equipment includes reporting of at least a first and a second precoding matrix indicator (PMI). First, second and third indices are determined based upon the first and the second PMI and third and fourth PMI and are employed to select the precoding matrix. The selected precoding matrix includes a first column comprising a first row partition and a second row partition, where the first row partition is a Kronecker product of at least first and second precoding vectors and the second row partition is a Kronecker product of a first term and a second term. The first term is a product of a co-phasing factor and the first precoding vector and the second term is the second precoding vector. The first precoding vector is selected from a first codebook and the second precoding vector is selected from a second codebook.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 illustrates a design for PUCCH mode 1-1 submode 2 in accordance with one embodiment of the present disclosure;

FIG. 6 illustrates a second design of PUCCH mode 1-1 submode 2 in accordance with one embodiment of the present disclosure;

FIG. 9 illustrates another design for PUCCH mode 2-1 with PTI=0 in accordance with one embodiment of the present disclosure;

FIG. 10 illustrates another design for PUCCH mode 2-1 with PTI=1 in accordance with one embodiment of the present disclosure;

FIG. 11 illustrates PUCCH feedback over multiple subframes according to some embodiments of the present disclosure;

FIG. 12 illustrates PUCCH feedback over multiple subframes according to some embodiments of the present disclosure;

FIG. 13 illustrates PUCCH feedback over multiple subframes according to some embodiments of the present disclosure;

FIG. 14 illustrates PUCCH feedback over multiple subframes according to some embodiments of the present disclosure;

FIGS. 16A and 16B illustrate vertical orientations between a base station and user equipment according to some embodiments of the present disclosure;

FIG. 17 illustrates rank 1 vertical precoding matrix information distribution according to some embodiments of the present disclosure; and FIG. 18 illustrates one to one mapping between antenna port and cross-polarized antenna elements according to some embodiments of the present disclosure.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents are incorporated herein by reference:

[REF1] 3GPP TS 36.211: "Evolved Universal Terrestrial Radio Access (E-UTRA); Physical channels and modulation."
[REF2] 3GPP TS 36.212, "E-UTRA, Multiplexing and Channel coding."
[REF3] 3GPP TS 36.213, "E-UTRA, Physical Layer Procedures."

Figure 1:
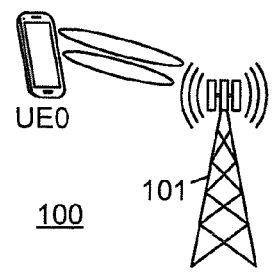
FIG. 1 illustrates a wireless communication system that may employ a precoding matrix design and periodic channel state information feedback according to some embodiments of the present disclosure.

List of Acronyms
AP: antenna port(s)
CB: codebook
CW: codeword
MIMO: multiple-input-multiple-output
SU-MIMO: single-user MIMO
MU-MIMO: multi-user MIMO
3GPP: 3rd Generation Partnership Project
LTE: Tong-Term Evolution
UE: user equipment
eNB: eNodeB or evolved Node B
(P)RB: (physical) resource block
DMRS: demodulation reference signal(s)
UE-RS: UE-specific reference signal(s)
CSI-RS: channel state information reference signals
MCS: modulation and coding scheme
RE: resource element
CQI: channel quality information
PMI: precoding matrix indicator
PTI: precoding type indicator
RI: rank indicator
MU-CQI: multi-user CQI
CSI: channel state information
CSI-IM: CSI interference measurement
CoMP: coordinated multi-point
NZP: non-zero power
DCI: downlink control information
DFT: Discrete Fourier Transform
DL: downlink
UL: uplink
PDSCH: physical downlink shared channel
PDCCH: physical downlink control channel
PUSCH: physical uplink shared channel
PUCCH: physical uplink control channel The present disclosure generally relates to wireless communication systems with multiple antenna elements, and more specifically relates to periodic channel status information (CSI) feedback for use in a system with multiple active antenna elements arranged in a two-dimensional panel. FIG. 1 illustrates operation of a wireless communication system according to some embodiments of the present disclosure. The UEs depicted in FIG. 1 each include: an antenna array; a receiver or transceiver coupled to the antenna array for demodulating received wireless signals, including reference signals such as CSI-RS; a controller or processor coupled to the receiver for estimating one or more channels between the respective UE and a base station, deriving channel quality information for the channels using the reference signals and one or more of the processes described below, and reporting at least the CQI and one or more indicators of precoding matrix selection(s) to the base station as described in further detail below; and a transmitter or the transceiver coupled to the processor/controller for transmitting feedback including the CQI and/or PMI report to the base station as discussed in further detail below. Each base station likewise includes at least an antenna array for transmitting and receiving signals, a receiver chain, a controller, and a transmitter chain. In the example depicted, user equipment (UE) UE0 receives streams from evolved Node B (eNB) 100. eNB 100 multiplexes data streams intended for UE1 and UE3 and data streams intended for UE2 and UE4. The communication system thus consists of a downlink (DL), where signals are transmitted from eNB, base station (BS), NodeBs or transmission point (TP) to user equipment, and an uplink (UL), where signals are transmitted from UE to BS or NodeB. A UE, also commonly referred to as a terminal or a mobile station, may be fixed or mobile and may be a cellular phone, a personal computer device, etc. An eNB, which is generally a fixed station, may also be referred to as an access point or other equivalent terminology. DL signals include data signals conveying information content, control signals conveying DL Control Information (DCI), and Reference Signals (RS), which are also known as pilot signals. The eNB transmits data information or DCI through respective Physical DL Shared CHannels (PDSCHs) or Physical DL Control CHannels (PDCCHs). The eNB transmits one or more of multiple types of RS including a UE-Common RS (CRS), a Channel State Information RS (CSI-RS), and a DeModulation RS (DMRS). A CRS is transmitted over a DL system Bandwidth (BW) and can be used by UEs to demodulate data or control signals or to perform measurements. For CSI estimation corresponding to a number of transmit antenna ports, the eNodeB may transmit CSI-RS in addition to the CRS.

The present disclosure deals with PUCCH periodic CSI feedback designs for FD-MIMO systems equipped with a two dimensional antenna array. In the LTE Release 8 and Release 10 standards; PUCCH periodic CSI feedback is designed to provide BS or eNB with coarse channel status information observed at UE, as PUCCH has narrow data pipe and limited capacity. Therefore, unlike PUSCH designs, PUCCH CSI feedback designs places feedback reliability and coverage as the first priority, over downlink throughput optimization. In the 3GPP Release 10, there are three types of PUCCH reporting modes that are extended from Release 8 to support the double codebook structure: (1) PUCCH Mode 1-1 Submode 1; (2) PUCCH Mode 1-1 Submode 2; and (3) PUCCH Mode 2-1. The present disclosure considers a Kronecker product type codebook structure, in which the overall codebook is the Kronecker product of a horizontal codebook (H-codebook) and a vertical codebook (V-codebook). Hence, in FD-MIMO systems using a Kronecker product codebook, UE needs to feedback not only PMI for the azimuth domain (also called the horizontal domain), but also PMI for the elevation domain (also called the vertical domain). In other words, PUCCH CSI feedback for FD-MIMO UEs has to carry more PMI than that adopted in Release 8 and Release 10 standards. On the other hand, to maintain good feedback reliability and coverage, PUCCH CSI feedback designs are subject to payload size constraints. The present disclosure describes a design for PUCCH CSI feedback that accommodates increased PMI feedback while maintaining feedback reliability and coverage. In particular, the proposed PUCCH designs in this disclosure keep the same payload size as counterparts specified in Release 10 PUCCH. In this disclosure, two particular antenna configurations are considered: 2 vertical APs with 8 horizontal APs; and 4 vertical APs with 8 horizontal APs.

Release 8 2-Tx and 4-Tx Codebook (CB)

For transmission on two antenna ports, $p \in \{0,1\}$, and for the purpose of CSI reporting based on two antenna ports $p \in \{0,1\}$ or $p \in \{15,16\}$, the precoding matrix W(i) shall be selected from TABLE 1 below, or a subset thereof:

TABLE 1

Codebook for transmission on APs {0,1} and for CSI reporting based on APs {0,1} or {15,16}

| Codebook Index | Number of layers $\upsilon$ | |
| --- | --- | --- |
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |

TABLE 1-continued

Codebook for transmission on APs {0,1} and for CSI reporting based on APs {0,1} or {15,16}

| Codebook Index | Number of layers $\upsilon$ | |
| --- | --- | --- |
| | 1 | 2 |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

For the closed-loop spatial multiplexing transmission mode defined in 3GPP TS 36.213 [REF3], the codebook index 0 is not used when the number of layers is $\upsilon=2$.

For transmission on four antenna ports, $p \in \{0,1,2,3\}$, the precoding matrix W shall be selected from TABLE 2 or a subset thereof. For the purpose of CSI reporting based on four antenna ports $p \in \{0,1,2,3\}$ or $p \in \{15,16,17,18\}$, the precoding matrix W shall be selected from TABLE 2 or a subset thereof except for alternativeCodeBookEnabledFor4TX-r12=TRUE, in which case the precoding matrix W shall be selected from Tables 7.2.4-0A, 7.2.4-0B, 7.2.4-0C, 7.2.4-0D in [REF3] or a subset thereof. The quantity $W_n^{\{s\}}$ denotes the matrix defined by the columns given by the set $\{s\}$ from the expression $$W_n = I - 2u_n u_n^H / u_n^H u_n,$$

where I is the 4×4 identity matrix and the vector $u_n$ is given by TABLE 2:

TABLE 2

Codebook for transmission on APs {0,1,2,3} and for CSI reporting based on APs {0,1,2,3} or {15,16,17,18}

| Codebook Index | $u_n$ | Number of layers $\upsilon$ | | | |
| --- | --- | --- | --- | --- | --- |
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |

TABLE 2-continued

Codebook for transmission on APs {0,1,2,3} and for CSI reporting based on APs {0,1,2,3} or {15,16,17,18}

| Codebook Index | $u_n$ | Number of layers υ | | | |
|---|---|---|---|---|---|
| | | 1 | 2 | 3 | 4 |
| 8  | $u_8 = [1\ -1\ 1\ 1]^T$    | $W_8^{\{1\}}$    | $W_8^{\{12\}}/\sqrt{2}$    | $W_8^{\{124\}}/\sqrt{3}$    | $W_8^{\{1234\}}/2$ |
| 9  | $u_9 = [1\ -j\ -1\ -j]^T$  | $W_9^{\{1\}}$    | $W_9^{\{14\}}/\sqrt{2}$    | $W_9^{\{134\}}/\sqrt{3}$    | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$| $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$| $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$| $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$  | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Release 12 4-Tx Enhanced CB and 8-Tx CB

In Release-10 8-Tx CB and Release-12 4-Tx enhanced CB, the double codebook structure is adopted. In the double codebook structure, the codebook W can be written as the product of the inner codebook $W_1$ and the outer codebook $W_2$, i.e., $W=W_1 W_2$, where $W_1$ is used to capture the long-term wideband channel characteristics and $W_2$ is used to capture the short-term frequency-selective channel characteristics. A inner codeword (CW), $W_1(i)$, has a block diagonal structure depicted as the follows:

$$W_1(i) = \begin{bmatrix} X(i) & 0 \\ X(i) & X(i) \end{bmatrix}$$

where X(i) is a matrix defined as follows:

$$X(i) = [b_{2i\,mod\,32}\ b_{(2i+1)\,mod\,32}\ b_{(2i+2)\,mod\,32}\ b_{(2i+3)\,mod\,32}]$$

with $b_n = [1\ e^{j2\pi n/32}\ e^{j2\pi 2n/32}\ e^{j2\pi 3n/32}]^T$. The outer codebook $W_2$ performs two functions: beam selection and co-phasing. For rank 1, the outer codebook $W_2$ is chosen to be $$W_2 = \left\{ \begin{bmatrix} Y_1 \\ Y_1 \end{bmatrix}, \begin{bmatrix} Y_1 \\ -Y_1 \end{bmatrix}, \begin{bmatrix} Y_1 \\ jY_1 \end{bmatrix}, \begin{bmatrix} Y_1 \\ -jY_1 \end{bmatrix} \right\}$$

where $Y_1 \in \{e_1, e_2, \ldots e_4\}$ with $e_i$ being the i-th column vector of a 4×4 identity matrix. The index i of the vector $e_i$ is called the beam selection index. There are total 16 codewords (4 bit codebook). For rank 2, the outer codebook $W_2$ is chosen to be $$W_2 = \left\{ \begin{bmatrix} Y_1 & Y_2 \\ Y_1 & -Y_2 \end{bmatrix}, \begin{bmatrix} Y_1 & Y_2 \\ jY_1 & -jY_2 \end{bmatrix} \right\}$$

where $(Y_1, Y_2) \in \{(e_1, e_1), (e_2, e_2), (e_3, e_3), (e_4, e_4), (e_1, e_2), (e_1, e_3), (e_2, e_3), (e_1, e_4)\}$. There are total 16 codewords (4 bit codebook).

For 8 antenna ports, each PMI value corresponds to a pair of codebook indices given in Table 7.2.4-1, 7.2.4-2, 7.2.4-3, 7.2.4-4, 7.2.4-5, 7.2.4-6, 7.2.4-7, or 7.2.4-8 in 3GPP TS36.213, where the quantities $\phi_m$ and $v_m$ are given by $$\phi_m = e^{j\pi m/2}$$

$$v_m = [1\ e^{j2\pi m/32}\ e^{j4\pi m/32}\ e^{j6\pi m/32}]^T.$$

For 8 antenna ports {15,16,17,18,19,20,21,22}, a first PMI value of $i_1 \in \{0,1, \ldots f(\upsilon)-1\}$ and a second PMI value of $i_2 \in \{0,1, \ldots g(\upsilon)-1\}$ correspond to the codebook indices $i_1$ and $i_2$ given in Table 7.2.4-j in 3GPP TS36.213, with υ equal to the associated RI value and where j=υ, f(υ)={16,16,4,4,4,4,4,1} and g(υ)={16,16,16,8,1,1,1,1}. For υ=1 and 2, corresponding tables are provided in TABLE 3 and TABLE 4 below.

In some cases codebook subsampling is supported. The sub-sampled codebook for PUCCH mode 1-1 submode 2 is defined in Table 7.2.2-1D for first and second precoding matrix indicator $i_1$ and $i_2$. Joint encoding of rank and the first precoding matrix indicator $i_1$ for PUCCH mode 1-1 submode 1 is defined in Table 7.2.2-1E in 3GPP TS36.213. The sub-sampled codebook for PUCCH mode 2-1 is defined in Table 7.2.2-1F in 3GPP TS36.213 for PUCCH Reporting Type 1a.

TABLE 3

Codebook for 1-layer CSI reporting using antenna ports 15 to 22

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ |

TABLE 3-continued

Codebook for 1-layer CSI reporting using antenna ports 15 to 22 where $W_{m,n}^{(1)} = \frac{1}{\sqrt{8}} \begin{bmatrix} v_m \\ \varphi_n v_m \end{bmatrix}$

TABLE 4

Codebook for 2-layer CSI reporting using antenna ports 15 to 22

| $i_1$ | $i_2$ = 0 | 1 | 2 | 3 |
|---|---|---|---|---|
| 0-15 | $W_{2i_1,2i_1,0}^{(2)}$ | $W_{2i_1,2i_1,1}^{(2)}$ | $W_{2i_1+1,2i_1+1,0}^{(2)}$ | $W_{2i_1+1,2i_1+1,1}^{(2)}$ |

| $i_1$ | $i_2$ = 4 | 5 | 6 | 7 |
|---|---|---|---|---|
| 0-15 | $W_{2i_1+2,2i_1+2,0}^{(2)}$ | $W_{2i_1+2,2i_1+2,1}^{(2)}$ | $W_{2i_1+3,2i_1+3,0}^{(2)}$ | $W_{2i_1+3,2i_1+3,1}^{(2)}$ |

| $i_1$ | $i_2$ = 8 | 9 | 10 | 11 |
|---|---|---|---|---|
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ = 12 | 13 | 14 | 15 |
|---|---|---|---|---|
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$ CSI Feedback In the LTE/LTE-Advanced cellular communication systems, UE needs to report rank indicator (RI), precoding matrix indicator (PMI), and channel quality indicator (CQI) in order to support link adaption and precoders used at eNB. There are two types of CSI feedback, periodic feedback and aperiodic feedback, described as follows:

Aperiodic Feedback on PUSCH:

PUSCH has relatively large data pipe and thus has relatively loose constraints on the feedback payload size. The CSI report via PUSCH is self-contained in the sense that CQI, PMI, and RI are reported together in one slot of the same subframe. For different PUSCH reporting modes, the frequency granularities of CQI and PMI are different (subband versus wideband) while RI always remains for wideband.

Periodic Feedback on PUCCH:

A UE is semi-statically configured by higher layers to periodically feedback CQI, PMI, PTI, and/or RI on the PUCCH using the reporting modes given TABLE 5. The details for each PUCCH CSI reporting modes can be found in [REF3]. Compared with PUSCH, PUCCH has limited capacity and narrow data pipe. For each rank, the maximum payload size is 11 bits. To meet feedback payload size constraints, codebook subsampling may be required. Unlike that for PUCCH, the CSI report for PUSCH consists of RI, PMI, and CQI that are transmitted in more than one subframe.

TABLE 5

Codebook for 2-layer CSI reporting using antenna ports 15 to 22

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Feedback Timing:

For a UE configured in transmission mode 1-9 and for each serving cell, or for a UE configured in transmission mode 10 and for each CSI process in each serving cell, the periodicity $N_{pd}$ (in subframes) and offset $N_{OFFSET,CQI}$ (in subframes) for CQI/PMI reporting are determined based on the parameter cqi-pmi-ConfigIndex($I_{CQI/PMI}$) given in Table 7.2.2-1A in 3GPP TS36.213 for FDD. The periodicity $M_{RI}$ and relative offset $N_{OFFSET,RI}$ for RI reporting are determined based on the parameter ri-ConfigIndex($I_{RI}$) given in Table 7.2.2-1C in 3GPP TS36.213. Both cqi-pmi-ConfigIndex and ri-ConfigIndex are configured by higher layer signaling. The relative reporting offset for RI $N_{OFFSET,RI}$ takes values from the set $\{0,-1, \ldots -(N_{pd}-1)\}$. If a UE is configured to report for more than one CSI subframe set then parameters cqi-pmi-ConfigIndex and ri-ConfigIndex respectively correspond to the CQI/PMI and RI periodicity and relative reporting offset for subframe set 1 and parameters cqi-pmi-ConfigIndex2 and ri-ConfigIndex2 respectively correspond to the CQI/PMI and RI periodicity and relative reporting offset for subframe set 2. For a UE configured with transmission mode 10, the parameters cqi-pmi-ConfigIndex, ri-ConfigIndex, cqi-pmi-ConfigIndex2 and ri-ConfigIndex2 can be configured for each CSI process.

In the case where wideband CQI/PMI reporting is configured:

The reporting instances for wideband CQI/PMI are subframes satisfying $(10 \times n_f + \lfloor n_s/2 \rfloor - N_{OFFSET,CQI}) \bmod (N_{pd}) = 0$, where $n_f$ is the system frame number and $n_s$ is the slot index within the frame.

In case RI reporting is configured, the reporting interval of the RI reporting is an integer multiple $M_{RI}$ of period $N_{pd}$ (in subframes).

The reporting instances for RI are subframes satisfying $(10 \times n_f + \lfloor n_s/2 \rfloor - N_{OFFSET,CQI} - N_{OFFSET,RI}) \bmod (N_{pd} \cdot M_{RI}) = 0$.

In the case where both wideband CQI/PMI and subband CQI reporting are configured:

4The reporting instances for wideband CQI/PMI and subband CQI are subframes satisfying $(10 \times n_f + \lfloor n_s/2 \rfloor - N_{OFFSET,CQI}) \bmod (N_{pd}) = 0$.

When PTI is not transmitted (due to not being configured) or the most recently transmitted PTI is equal to 1 for a UE configured in transmission modes 8 and 9, or for a UE configured in transmission mode 10 without a "RI-reference CSI process" for a CSI process, or the transmitted PTI is equal to 1 reported in the most recent RI reporting instance for a CSI process when a UE is configured in transmission mode 10 with a "RI-reference CSI process" for the CSI process, or the transmitted PTI is equal to 1 for a "RI-reference CSI process" reported in the most recent RI reporting instance for a CSI process when a UE is configured in transmission mode 10 with the "RI-reference CSI process" for the CSI process, and the most recent type 6 report for the CSI process is dropped:

The wideband CQI/wideband PMI (or wideband CQI/wideband second PMI for transmission modes 8, 9 and 10) report has period $H \cdot N_{pd}$, and is reported on the subframes satisfying $(10 \times n_f + \lfloor n_s/2 \rfloor - N_{OFFSET,CQI}) \bmod (H \cdot N_{pd}) = 0$. The integer H is defined as $H = J \cdot K + 1$, where J is the number of bandwidth parts.

Between every two consecutive wideband CQI/wideband PMI (or wideband CQI/wideband second PMI for transmission modes 8, 9 and 10) reports, the remaining J·K reporting instances are used in sequence for subband CQI reports on K full cycles of bandwidth parts except when the gap between two consecutive wideband CQI/PMI reports contains less than J·K reporting instances due to a system frame number transition to 0, in which case the UE shall not transmit the remainder of the subband CQI reports which have not been transmitted before the second of the two wideband CQI/wideband PMI (or wideband CQI/wideband second PMI for transmission modes 8, 9 and 10) reports. Each full cycle of bandwidth parts shall be in increasing order starting from bandwidth part 0 to bandwidth part J−1. The parameter K is configured by higher-layer signaling.

When the most recently transmitted PTI is 0 for a UE configured in transmission modes 8 and 9 or for a UE configured in transmission mode 10 without a "RI-reference CSI process" for a CSI process, or the transmitted PTI is 0 reported in the most recent RI reporting instance for a CSI process when a UE is configured in transmission mode 10 with a "RI-reference CSI process" for the CSI process, or the transmitted PTI is 0 for a "RI-reference CSI process" reported in the most recent RI reporting instance for a CSI process when a UE is configured in transmission mode 10 with the "RI-reference CSI process" for the CSI process, and the most recent type 6 report for the CSI process is dropped:

The wideband first precoding matrix indicator report has period $H' \cdot N_{pd}$, and is reported on the subframes satisfying $(10 \times n_f + \lfloor n_s/2 \rfloor - N_{OFFSET,CQI}) \bmod (H' \cdot N_{pd}) = 0$, where H' is signaled by higher layers.

Between every two consecutive wideband first precoding matrix indicator reports, the remaining reporting instances are used for a wideband second precoding matrix indicator with wideband CQI.

In case RI reporting is configured, the reporting interval of RI is $M_{RI}$ times the wideband CQI/PMI period $H \cdot N_{pd}$, and RI is reported on the same PUCCH cyclic shift resource as both the wideband CQI/PMI and subband CQI reports. The reporting instances for RI are subframes satisfying: $(10 \times n_f + \lfloor n_s/2 \rfloor - N_{OFFSET,CQI} - N_{OFFSET,RI}) \bmod (H \cdot N_{pd} \cdot M_{RI}) = 0$ The sub-sampled codebook for PUCCH mode 1-1 submode 2 for 8 CSI-RS ports is defined in TABLE 6 for first and second precoding matrix indicator $i_1$ and $i_2$:

TABLE 6

PUCCH mode 1-1 submode 2 codebook subsampling

| RI | Relationship between the first PMI value and codebook index $i_1$ | | Relationship between the second PMI value and codebook index $i_2$ | | Total # bits |
|---|---|---|---|---|---|
| | Value of the first PMI $I_{PMI1}$ | Codebook index $i_1$ | Value of the second PMI $I_{PMI2}$ | Codebook index $i_2$ | |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4 \cdot \lfloor I_{PMI2}/4 \rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

TABLE 7 shows PUCCH mode 2-1 codebook subsampling for the second PMI feedback:

TABLE 7

PUCCH mode 1-1 submode 2 codebook subsampling

Relationship between the second PMI value and codebook index $i_2$

| RI | Value of the second PMI $I_{PMI2}$ | Codebook index $i_2$ |
|---|---|---|
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2) + 2$ |
| 4 | 0-3 | $2I_{PMI2}$ |
| 5 | 0 | 0 |
| 6 | 0 | 0 |
| 7 | 0 | 0 |
| 8 | 0 | 0 |

The present disclosure deals with PUCCH periodic CSI feedback designs for FD-MIMO systems equipped with a two dimensional antenna array. In the LTE Release 8 and Release 10 standards, PUCCH periodic CSI feedback is designed to provide BS or NodeB with coarse channel status information observed at UE, as PUCCH has narrow data pipe and limited capacity. Therefore, unlike PUSCH designs, PUCCH CSI feedback designs place feedback reliability and coverage as the first priority instead of downlink throughput optimization. In the 3GPP Release 10, there are three types of PUCCH reporting modes that are extended from Release 8 to support the double codebook structure. These three PUCCH reporting modes in Release 10 are listed as follows: 1) PUCCH Mode 1-1 Submode 1, 2) PUCCH Mode 1-1 Submode 2, and 3) PUCCH Mode 2-1. This disclosure considers a Kronecker product type codebook structure, in which the overall codebook is the Kronecker product of a horizontal codebook (H-codebook) and a vertical codebook (V-codebook). Hence, in FD-MIMO systems using a Kronecker product codebook, UE needs to feedback not only PMI for the azimuth domain (also called the horizontal domain), but also PMI for the elevation domain (also called the vertical domain). In other words, PUCCH CSI feedback for FD-MIMO UEs has to carry more PMI than the ones adopted in Release 8 and Release 10 standards. On the other hand, to maintain good feedback reliability and coverage, PUCCH CSI feedback designs are subject to payload size constraints. This disclosure describes a design for PUCCH CSI feedback to accommodate increased PMI feedback while maintaining feedback reliability and coverage. In particular, the proposed PUCCH designs in this disclosure keep the same payload size as one specified in Release 10 PUCCH. In this disclosure, two particular antenna configurations, two vertical antenna patches (APs) with eight horizontal APs, and four vertical APs with eight horizontal APs, are considered.

FIG. 1 illustrates a wireless communication system that may employ a precoding matrix design and periodic channel state information feedback according to some embodiments of the present disclosure. The wireless communication system 100 includes one or more user equipment (UEs), including UE0 explicitly depicted, and one or more base stations (BSs) 101, also referred to a NodeB or evolved NodeB (eNB). UE0 includes an antenna array, a receiver coupled to the antenna array for demodulating received wireless signals, a controller deriving channel quality information, and a transmitter for transmitting feedback to a base station. BS 101 likewise includes at least an antenna array for transmitting and receiving signals, a receiver chain, a controller, and a transmitter chain. In the example shown, UE0 communicates with BS 101 via multiple concurrent streams.

Figure 1A:
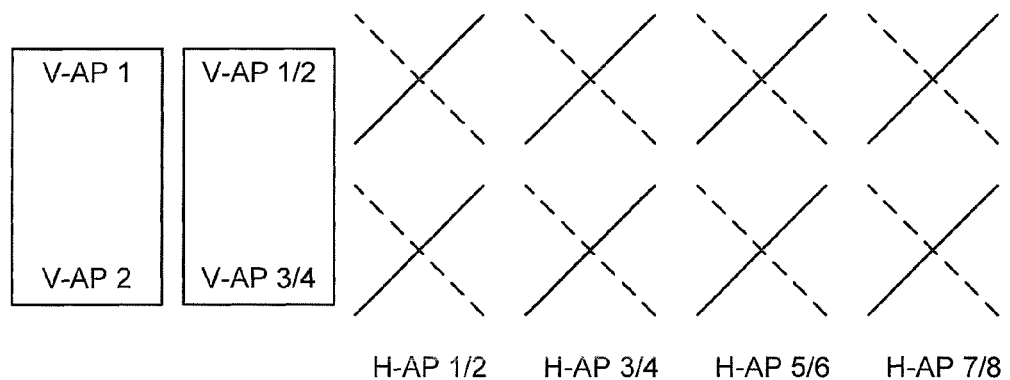
FIG. 1A illustrates a two-row, four-column, cross-polarized, two-dimensional logical antenna array that may be employed within the wireless communication system of FIG. 1.

FIG. 1A illustrates a two-row, four-column, cross-polarized, two-dimensional (2D) logical antenna array that may be employed within the wireless communication system of FIG. 1. The 2D logical antenna array comprises $N_{col}$=4 columns of cross-polarized (x-pol) antenna sub-arrays, wherein each column of x-pol sub-arrays comprises $N_{row}$=2 pairs of x-pol antennas placed on a substantially vertical line. $N_H$ horizontal antenna ports (H-APs) are allocated across the $N_{col}$ columns, where each column of antennas is associated with 2 H-APs respectively for the +45° polarization and for the −45° polarization. For the vertical antenna ports (V-APs), two alternative configurations are explicitly considered in this disclosure: In Option 1, $N_V$=2 V-APs are allocated across the two rows, where each row of antennas is associated with one V-AP. In Option 2, $N_V$=4 V-APs are allocated across the $N_{row}$=2 rows, where each row of antennas is associated with two V-APs respectively for the +45° polarization and for the −45° polarization.

For PMI feedback for the 2D logical antenna array shown in FIG. 1A, Release-8 $N_V$-Tx CB (Table 1 for $N_V$=2 and Table 2 for $N_V$=4) is used for the vertical CB $W_V$ and Release-10 8-Tx inner and outer CBs given in Table 3 and Table 4 are used for the horizontal inner CB $W_{1H}$ and the outer CB $W_{2H}$. The overall codebook can be written as $W=W_V \otimes W_H$ with $W_H=W_{1H}W_{2H}$, wherein $W_V$ is a vertical codebook and $W_H$ is the horizontal codebook.

For the PMI feedback for these codebooks, two sets of nonzero-power (NZP) channel-state-information reference-signals (CSI-RS) can be configured via configuration of two parameter sets of {resourceConfig, subframeConfig}. For example, one CSI-RS configuration is provided for estimating $W_H$ and the other configuration is provided for estimating $W_V$.

In some embodiments, V-PMI is constructed according to one of the following alternatives:

$W_{1V}$ is the identity matrix and $W_{2V}$ is the precoding matrix from Release-8 2-Tx codebook, 4-Tx codebook, or a DFT codebook. In this case, a UE needs to feedback PMI for $W_{2V}$ only; and $W_{2V}$ is the identity matrix and $W_{1V}$ is the precoding matrix from Release-8 2-Tx codebook, 4-Tx codebook, or a DFT codebook. In this case, a UE needs to feedback PMI for $W_{1V}$ only.

In some embodiments, the overall rank-1 and rank-2 CB W are constructed as follows, considering that UEs may experience channels in which either elevation or azimuth angle spread is larger than the other.

A rank-1 codeword $w \in W$ is constructed such that both $w_V \in W_V$ and $w_H \in W_H$ are a rank-1 precoding vector.

A rank-2 codeword $w \in W$ is constructed according to one of the following methods:

$w_V \in W_V$ is a rank-1 precoding vector, and $w_H \in W_H$ is a rank-2 precoding matrix;

$w_V \in W_V$ is a rank-2 precoding matrix, and $w_H \in W_H$ is a rank-1 precoding vector.

In this disclosure, the feedback reliability and coverage instead of downlink throughput optimization are placed in the top priority of our PUCCH feedback designs. It is well-known that the payload sizes are directly related to feedback reliability and coverage. Therefore, in this disclosure, payload sizes for respective rank-1 and rank-2 are not increased as compared with those used in Release 10 8-Tx codebook designs.

PUCCH Mode 1-1 Submode 1 for FIG. 1A

In a first design of PUCCH mode 1-1 submode 1 for FIG. 1A, RI and the first H-PMI ($W_{1H}$) are jointly encoded and are transmitted in the subframes for RI reporting. TABLE 8 lists the details of the joint encoding of RI and $W_{1H}$, with RI=1 or 2. The effective total number of bits for RI+$W_{1H}$ is 5 bits, when eNB is aware of the fact that the maximum rank from a UE is 2. Two design examples of PUCCH mode 1-1 including the other CSI ($W_{2V}=W_V$, $W_{2H}$ and CQI) are described below.

TABLE 8

RI and $W_{1H}$ Joint Encoding

| RI | RI and $W_{1H}$ joint encoding | Total number bits |
|---|---|---|
| 1 | $W_{1H}$: 0-15 (1$^{st}$ PMI $i_1$ in Table 3) | 4 bits |
| 2 | $W_{1H}$: 0-15 (1$^{st}$ PMI $i_1$ in Table 3) | 4 bits |
| Effective total number bits of $W_{1H}$ + RI across ranks 1-2 | | 5 bits |

Figure 2:
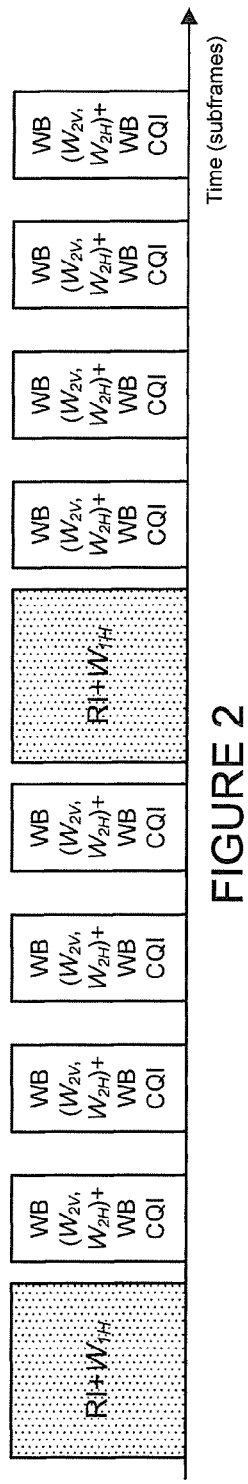
FIG. 2 illustrates a design for PUCCH mode 1-1 submode 1 in accordance with one embodiment of the present disclosure.

1) PUCCH Mode 1-1 Submode 1 Design 1 for FIG. 1A:

FIG. 2 illustrates a design for PUCCH mode 1-1 submode 1 in accordance with one embodiment of the present disclosure. FIG. 2 illustrates PUCCH mode 1-1 submode 1 Design 1 for FIG. 1A. In those subframes for WB CQI/PMI reporting, WB $W_{2H}$ and WB CQI are transmitted. This design is for cases where reliability requirement of $W_{2V}$ and $W_{2H}$ are the same, and the channels associated with the two PMIs changes in similar time scale. In this and in each of the following examples of subframes reporting CQI and/or PMI on PUCCH, $i_{2V}$ and $i_{2H}$ may be reported in lieu of $W_{2V}$ and $W_{2H}$, respectively, and $i_{1V}$ and $i_{1H}$ may respectively be reported in lieu of $W_{1V}$ and $W_{1H}$. Likewise, discussions below of subsampling any of $W_{1V}$, $W_{1H}$, $W_{2V}$, and $W_{2H}$ for reporting purposes are equally applicable to reporting the corresponding $i_{1V}$, $i_{1H}$, $i_{2V}$ and $i_{2H}$.

TABLE 9 and TABLE 10 contain details of WB ($W_{2V}$, $W_{2H}$)+WB CQI reporting contents respectively for $N_V$=2 and $N_V$=4, in which specific codebook subsampling examples are described.

number DFT beams can be selected by this particular is $W_{2H}$ subsampling is still 32 in the horizontal dimension of the overall codebook $W_{1H}W_{2H}$, same as that of the Release 10 8-Tx codebook.

One subsampling example for the rank-2 case is also given in TABLE 9. To keep the total number of bits for ($W_{2V}$, $W_{2H}$) to be 4 bits, only 16 states should be constructed, among which two sets of 8 states are constructed.

A first set comprises rank-1 $W_{2V}$ and rank-2 $W_{2H}$. It is proposed to use {0,2} for rank-1 $W_{2V}$ in Table 1 with $\upsilon$=1, and {0,1,4,5} for rank-2 $W_{2H}$. For rank 1 $W_{2V}$, sub-sampling of a factor 2 is applied. Since the beam-width in the vertical dimension is relatively wide, sub-sampling of a factor 2 will not lead to much performance loss. According to Table 4, the indices 0 and 4 of the second PMI $i_2$ correspond to the first horizontal beam in a codeword $W_{1H}$ with co-phasing factors {+1, −1} and the indices 1 and 5 of the second PMI $i_2$ correspond to the second horizontal beam in a codeword $W_{1H}$ with co-phasing factors {+j, −j}. Sub-sampled $W_{2H}$ enables horizontal beam selection of only (beam 1, beam 1) and (beam 3, beam 3) with two sets of co-phasing factors in the rank 2 case.

A second set comprises rank-2 $W_{2V}$ and rank-1 $W_{2H}$. In this case sub-sampling of factor 2 is applied to rank-2 $W_{2V}$. The index for reporting $W_{2V}$ is fixed to a value among 0, 1, 2, and no feedback is needed. It is noted that for full-rank channels, channel capacity does not change over different choices of orthogonal matrices, and all the three matrices corresponding to indices 0, 1, 2 are orthogonal. For reporting rank-1 $W_{2H}$, the sub-

TABLE 9

($W_{2V}$, $W_{2H}$) + WB CQI feedback with 2-Tx V-PMI codebook

| RI | ($W_{2V}$, $W_{2H}$) | Total number bits for ($W_{2V}$, $W_{2H}$) | Total number bits for ($W_{2V}$, $W_{2H}$) + CQI |
|---|---|---|---|
| 1 | $W_{2V}$: 0, 2 (CW index of v = 1 of Table 1)<br>$W_{2H}$: 0-7 (2$^{nd}$ PMI $i_2$ in Table 3) | 4 bits | 8 bits |
| 2 | A first set:<br><br>$W_{2V}$: 0, 2 (CW index of v = 1 of Table 1)<br>$W_{2H}$: 0, 1, 4, 5 (2$^{nd}$ PMI $i_2$ in Table 3)<br>A second set:<br><br>$W_{2V}$: one of 0, 1, 2 (CW index of v = 2 of Table 1)<br>$W_{2H}$: 0-7 (2$^{nd}$ PMI $i_2$ in Table 3) | 4 bits | 11 bits |

For the case of $N_V$=2 and rank 1, the beam-width in the vertical dimension is fairly wide since only two vertical antenna ports are used. Sub-sampling $W_{2V}$ by a factor of 2 will save additional 1 bit for carrying the information of $W_{2H}$. On the other hand, for $W_{2H}$, it is also proposed to apply sub-sampling in order to keep the payload of ($W_{2V}$, $W_{2H}$) to be 4 bits so that the reliability of the ($W_{2V}$, $W_{2H}$) feedback is the same as the legacy $W_2$+CQI feedback. In the case of $N_V$=2 and rank 2, it is proposed to apply sub-sampling for both $W_{2V}$ and $W_{2H}$ to keep the total payload of ($W_{2V}$, $W_{2H}$)+CQI to be 11 bits, so that PUCCH format 2/2a/2b can carry the information.

In one subsampling example given in TABLE 9, the subsampling set for rank-1 $W_{2H}$ is $i_2$={0,1,2,3,4,5,6,7}. According to Table 3, both index sets {0,1,2,3} and {4,5,6,7} of the second PMI $i_2$ respectively corresponds to a first and a second horizontal beams in a codeword $W_{1H}$ with four co-phasing factors {+1, −1, +j, −j}. Sub-sampled $W_{2H}$ only enables horizontal beam selection of beam 1 and beam 2 in a $W_{1H}$ codeword. As $W_{1H}$ is not subsampled, the total sampling set of $W_{2H}$ in the overall rank-2 case is chosen to be the same as one in the overall rank-1 case: {0,1,2,3,4,5,6,7}.

In the case of $N_V$=4, it is proposed to apply sub-sampling for both $W_{2V}$ and $W_{2H}$ to keep the payload of ($W_{2V}$, $W_{2H}$) to be 4 bits, similarly to the case of $N_V$=2.

In one subsampling example in TABLE 10, the subsampling set for rank-1 $W_{2V}$ is {0,1,2,3} according to the definition in Table 2 with $\upsilon$=1. The indices 0, 1, 2, and 3 in Table 2 correspond to the four DFT vectors of size 4. The subsampling set for rank-1 $W_{2H}$ is {0,2,8,10}, which are the second PMI in Table 3. The indices 0 and 2 correspond to the selection of beam 1 in the horizontal dimension with respective co-phasing factors 1 and −1, while the indices 4 and 6 correspond to the selection of beam 2 in the horizontal dimension with respective co-phasing factor 1 and −1. Thus, the total DFT beam selection granularity in the horizontal dimension of the overall codebook $W_{2V}W_{2H}$ is the same as that of the Release 10 8-Tx codebook since all the 32 candidate beams are represented. However, unlike the case of $N_V$=2, the co-phasing factors are also sub-sampled by a factor of 2.

TABLE 10

(W$_{2V}$, W$_{2H}$) and WB CQI feedback with 4-Tx V-PMI codebook

| RI (W$_{2V}$, W$_{2H}$) | Total number bits for (W$_{2V}$, W$_{2H}$) | Total number bits for (W$_{2V}$, W$_{2H}$) + CQI |
|---|---|---|
| 1  W$_{2V}$: 0, 1, 2, 3 (CW index of v = 1 of Table 2)<br>W$_{2H}$: 0, 2, 4, 6 (2$^{nd}$ PMI i$_2$ in Table 3) | 4 bits | 8 bits |
| 2  A first set:<br><br>W$_{2V}$: 0, 2 (CW index of v = 1 of Table 2)<br>A second set:<br><br>W$_{2H}$: 0, 1, 2, 3 (2$^{nd}$ PMI i$_2$ in Table 4)<br>W$_{2V}$: one of 16 CW indices of v = 2 of Table 2<br>W$_{2H}$: 0-7 (2$^{nd}$ PMI i$_2$ in Table 3) | 4 bits | 11 bits |

One subsampling example for the rank-2 case is also given in TABLE 10. Similarly to the case of N$_V$=2, two sets of 8 states are constructed:

A first set comprises rank-1 W$_{2V}$ and rank-2 W$_{2H}$. It is proposed to use {0,2} for rank-1 in Table 2 with υ=1, which correspond to two DFT vectors of size 4. The selection provides coarse channel sampling in the vertical dimension. Also it is proposed to use {0,1,2, and 3} for rank-2 W$_{2H}$. Index sets {0,1} and {2,3} respectively correspond to the horizontal beam selection of beam 1 and beam 2 with respective co-phasing factor sets {+1, −1} and {+j, −j}. By this selection, all possible set of co-phasing factors are chosen and the total DFT beam selection granularity in the horizontal dimension is 32 as all the 32 candidate beams are represented.

A second set comprises rank-2 W$_{2V}$ and rank-1 W$_{2H}$. Same as the N$_V$=2 case, it is proposed to use one value out of those 16 PMI values corresponding to Table 2 with υ=2 for rank-2 W$_{2V}$, similarly to the N$_V$=2 case. For reporting rank-1 W$_{2H}$, the subsampling set is {0,1, . . . , 7} based on the same reasoning as in the N$_V$=2 case.

Figure 3:
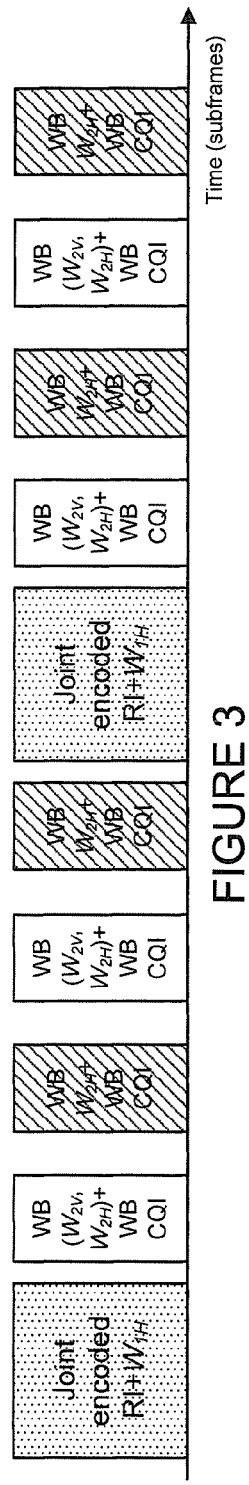
FIG. 3 illustrates a second design of PUCCH mode 1-1 submode 1 in accordance with one embodiment of the present disclosure.

2) PUCCH Mode 1-1 Submode 1 Design 2 for FIG. 1A:

FIG. 3 illustrates a second design of PUCCH mode 1-1 submode 1 in accordance with one embodiment of the present disclosure. FIG. 3 illustrates PUCCH mode 1-1 submode 1 Design 2 for FIG. 1A. The reports of the two new reporting types (i.e., WB (W$_{2V}$, W$_{2H}$)+CQI and WB W$_{2H}$+CQI) alternate in time in those subframes for WB CQI/PMI reporting.

TABLE 9 and TABLE 10 are respectively used for (W$_{2V}$, W$_{2H}$) and WB CQI feedback with N$_V$=2 and N$_V$=4; and TABLE 11 is used for W$_{2H}$+WB CQI. In this design, reliability of H-PMI W$_{2H}$ is improved as compared with Design 1. This is because in every other WB CQI/PMI reporting instances, only the second H-PMI W$_{2H}$ and WB CQI are reported. On the contrary, reliability of V-PMI is reduced as the feedback frequency of the second V-PMI is reduced by half. This reliability reduction may be tolerable in those scenarios where UEs remain more static in the vertical dimension than in the horizontal dimension.

TABLE 11

W$_{2H}$ + CQI feedback

| RI | W$_{2H}$ | Total number bits for W$_{2H}$ | Total number bits for W$_{2H}$ + CQI |
|---|---|---|---|
| 1 | W$_{2H}$: 0-15<br>(2$^{nd}$ PMI i$_2$ in Table 3) | 4 bits | 8 bits |
| 2 | W$_{2H}$: 0-15<br>(2$^{nd}$ PMI i$_2$ in Table 4) | 4 bits | 11 bits |

Figure 4:
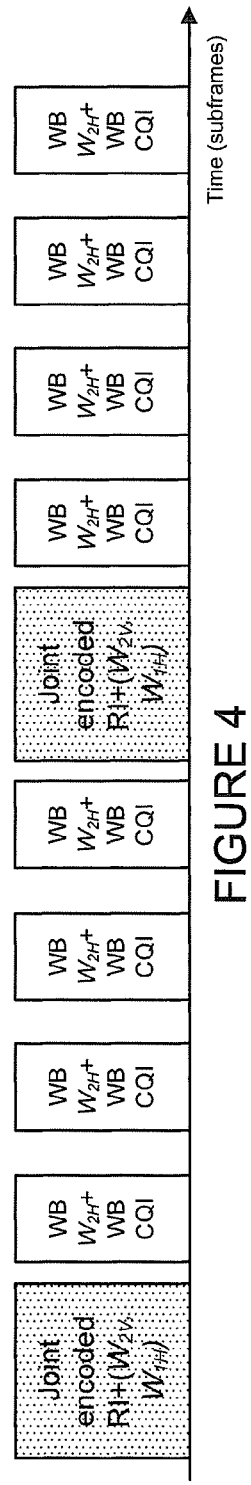
FIG. 4 illustrates a third design of PUCCH mode 1-1 submode 1 in accordance with one embodiment of the present disclosure.

3) PUCCH Mode 1-1 Submode 1 Design 3 for FIG. 1A:

FIG. 4 illustrates a third design of PUCCH mode 1-1 submode 1 in accordance with one embodiment of the present disclosure. FIG. 4 illustrates PUCCH mode 1-1 Submode 1 Design 3 for FIG. 1A. In another design of PUCCH mode 1-1 submode 1, RI, W$_{2V}$=(W$_{1V}$) and W$_{2H}$ are jointly encoded and transmitted in RI reporting instances, as illustrated in FIG. 4. Compared to other designs, this design achieves more reliable W$_{2H}$ feedback but less reliability for (W$_{2V}$, W$_{1H}$) feedback, as the feedback frequency of W$_{2V}$ is reduced and more information, i.e., (W$_{2V}$, W$_{1H}$), is jointly encoded with RI. Meanwhile, it is proposed to keep the total number of bits for joint encoding RI to be 5, the same as the legacy RI+WB W$_1$ report. Examples designs of joint encoding of RI and (W$_{2V}$, W$_{1H}$) are shown in TABLE 12 and TABLE 13, respectively for N$_V$=2 and N$_V$=4.

TABLE 12

Joint encoding of (W$_{2V}$, W$_{1H}$) + RI with 2-Tx V-PMI codebook

| RI (W$_{2V}$, W$_{1H}$) | Total number bits |
|---|---|
| 1  W$_{2V}$: 0, 1 (CW index in Table 1 with v = 1)<br>W$_{1H}$: 0, 2, 4, 6, 8, 10, 12, 14 (1$^{st}$ PMI i$_1$ in Table 3) | 4 bits |
| 2  A first set:<br><br>W$_{2V}$: one of 0, 1, 2 (CW index in Table 1 with v = 2)<br>W$_{1H}$: 0, 2, 4, 6, 8, 10, 12, 14 (1$^{st}$ PMI i$_1$ in Table 4)<br>A second set:<br><br>W$_{2V}$: 0, 2 (CW index in Table 1 with v = 1)<br>W$_{1H}$: 0, 4, 8, 12 (1$^{st}$ PMI i$_1$ in Table 4) | 4 bits |
| Total number bits of (W$_{2V}$, W$_{1H}$) + RI across ranks 1-2 | 5 bits |

In the overall rank-1 case in TABLE 12, the W$_{2V}$ subsampling set is {0,1} of rank-1 2-Tx codebook and the W$_{1H}$ subsampling set is {0,2,4,6,8,10,12,14}, corresponding to uniformly sampled PMIs in Table 3. By this selection of the subsampling set of W$_{1H}$, the CWs corresponding to the selected PMIs contain all 32 non-overlapping beams.

In the overall rank-2 cases in TABLE 12, it is proposed to the following subsampling for W$_{1H}$ and W$_{2V}$.

In the case of the rank-2 $W_{2V}$ and the rank-1 $W_{1H}$ construction, sub-sampling of factor 2 is applied to $W_{2V}$. The feedback index for $W_{2V}$ is fixed and thus does not need to be fed back. For the overall rank-2 case, the sub-sampling method is the same as one in the overall rank-1 case.

In the case of the rank-1 $W_{2V}$ and the rank-2 $W_{1H}$ construction, the $W_{2V}$ subsampling set is {0,2} and the $W_{1H}$ subsampling set is {0,4,8,12}, which selects four codewords with a large spatial separation.

In TABLE 13, the same subsampling method is applied for $W_{1H}$ in the overall rank-1 case as before with the same reasoning. In the overall rank-1 case, the $W_{2V}$ subsampling set is {0,2}. In the case of the overall rank-2 $W_V$ and the rank-1 $W_H$ construction, the $W_{2V}$ subsampling set is {0,2}. In the case of the rank-1 $W_V$ and the rank-2 $W_H$ construction, the $W_{2V}$ subsampling set is {0,2}.

TABLE 13

Joint encoding of ($W_{2V}$, $W_{1H}$) + RI with 4-Tx V-PMI codebook

| RI | Sub-sampling for ($W_{2V}$, $W_{1H}$) | Total number bits |
|---|---|---|
| 1 | $W_{2V}$: 0, 2 (CW index in Table 2 with v = 1)<br>$W_{1H}$: 0, 2, 4, 6, 8, 10, 12, 14 (1$^{st}$ PMI $i_1$ in Table 3) | 4 bits |
| 2 | A first set:<br>$W_{2V}$: 0, 2 (CW index in Table 2 with v = 2)<br>$W_{1H}$: 0, 4, 8, 12 (1$^{st}$ PMI $i_1$ in Table 3)<br>A second set:<br>$W_{2V}$: 0, 2 (CW index in Table 2 with v = 1)<br>$W_{1H}$: 0, 4, 8, 12 (1$^{st}$ PMI $i_1$ in Table 3) | 4 bits |
| | Total number bits of ($W_{2V}$, $W_{1H}$) + RI across ranks 1-2 | 5 bits |

PUCCH Mode 1-1 Submode 2 for FIG. 1A

In PUCCH Mode 1-1 Submode 2, only RI is transmitted in RI reporting instances.

FIG. 5 illustrates a design for PUCCH mode 1-1 submode 2 in accordance with one embodiment of the present disclosure. FIG. 5 illustrates PUCCH mode 1-1 submode 2 Design 1 for FIG. 1A. In a first design of PUCCH mode 1-1 submode 2, illustrated in FIG. 5, WB ($W_{1H}$, $W_{2V}$)+CQI, and WB ($W_{1H}$, $W_{2H}$)+CQI alternate in time in reporting instances of WB PMI/CQI. In this design, the RI and $W_{1H}$ feedback reliability are the same as those in the legacy 8-Tx codebook. To accommodate additional feedback for $W_{2V}$, the feedback frequency of $W_{2H}$ is reduced.

FIG. 6 illustrates a second design of PUCCH mode 1-1 submode 2 in accordance with one embodiment of the present disclosure. FIG. 6 illustrates PUCCH mode 1-1 Submode 2 Design 2 for FIG. 1A. In a second design of PUCCH mode 1-1 submode 2, illustrated in FIG. 6, WB ($W_{1H}$, $W_{2V}$)+CQI, and WB $W_{2H}$+CQI alternate in time in WB CQI/PMI reporting instances. Compared with the first design, this design aims to improve the reliability of $W_{2H}$ at the expense of increasing the feedback duty cycle of $W_{1H}$.

Since $W_{1H}$ is used to capture long-term and wide-band channel properties, the reduction on the feedback frequency on $W_{1H}$ is not likely to introduce performance degradation.

In these designs, WB ($W_{1H}$, $W_{2V}$)+CQI in TABLE 12 and TABLE 13 can be used respectively for $N_V$=2 and $N_V$=4. TABLE 6 can be used for WB ($W_{1H}$, $W_{2H}$)+CQI, with ($W_{1H}$, $W_{2H}$) for FIG. 5. TABLE 11 can be used for WB $W_{2H}$ and CQI.

PUCCH Mode 2-1 for FIG. 1A

In PUCCH mode 2-1, reporting type 6 (RI and PTI) are transmitted in RI reporting instances.

1) PUCCH Mode 2-1 Design 1 for FIG. 1A

Figure 7:
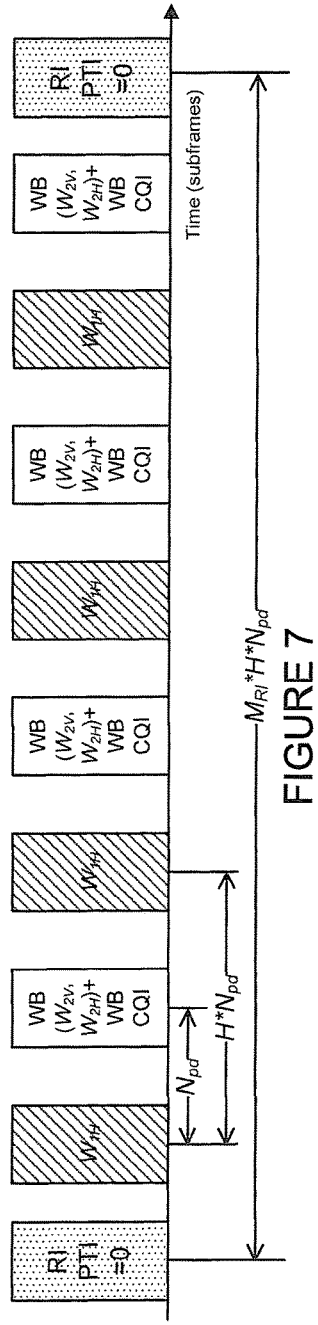
FIG. 7 illustrates a design for PUCCH mode 2-1 with PTI=0 in accordance with one embodiment of the present disclosure.

FIG. 7 illustrates a design for PUCCH mode 2-1 with PTI=0 in accordance with one embodiment of the present disclosure. FIG. 7 illustrates PUCCH mode 2-1 design 1 for FIG. 1A with PTI=0. Referring to FIG. 7 for PTI=0, $W_{1H}$ is transmitted in subframes satisfying the following condition:

The wideband first precoding matrix indicator report has a period of $H \cdot N_{pd}$, and is reported on the subframes satisfying $(10 \times n_f + \lfloor n_s/2 \rfloor - N_{OFFSET,CQI}) \mod (H \cdot N_{pd}) = 0$, where H is signaled by higher layers.

WB ($W_{2V}$, $W_{2H}$)+CQI are transmitted in those subframes according to the following description:

Between every two consecutive wideband first precoding matrix indicator reports, the remaining reporting instances are used for a wideband second precoding matrix indicator with wideband CQI.

Figure 8A:
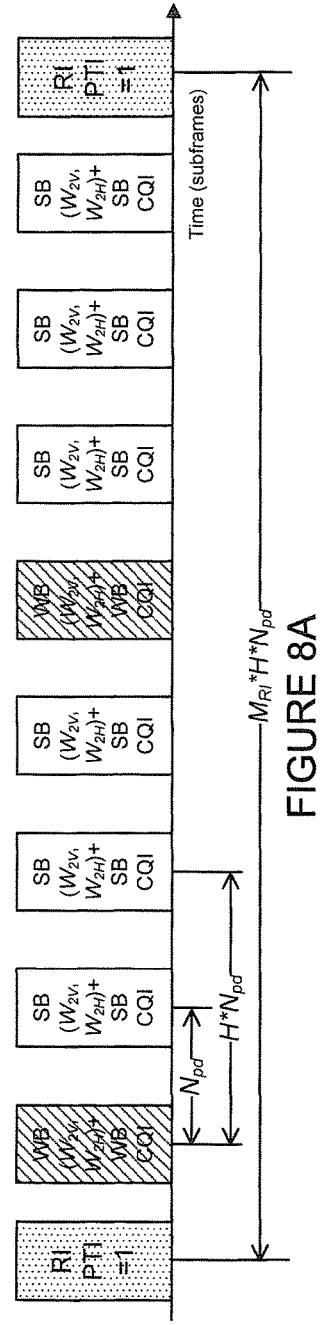
FIGS. 8A and 8B illustrate two alternative designs of PUCCH mode 2-1 with PTI=1 in accordance with one embodiment of the present disclosure.
Figure 8B:
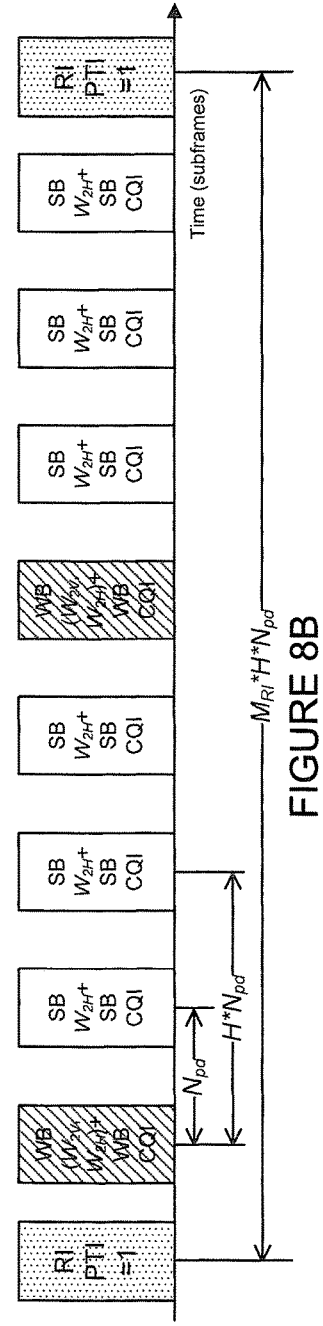

FIGS. 8A and 8B illustrate two alternative designs of PUCCH mode 2-1 with PTI=1 in accordance with one embodiment of the present disclosure. FIGS. 8A and 8B illustrate PUCCH mode 2-1 Design 1A (FIG. 8A) and Design 1B (FIG. 8B) for FIG. 1A with PTI=1. In FIGS. 8A and 8B for PTI=1, WB ($W_{2V}$, $W_{2H}$)+WB CQI are transmitted in reporting instances of WB CQI/PMI.

Either SB ($W_{2V}$, $W_{2H}$)+CQI or SB $W_{2H}$+CQI are transmitted according to the following description:

Between every two wideband CQI/wideband second PMI reports, the remaining J·K reporting instances are used in sequence for subband CQI reports on K full cycles of bandwidth parts except when the gap between two consecutive wideband CQI/PMI reports contains less than J·K reporting instances due to a system frame number transition to 0, in which case the UE shall not transmit the remainder of the subband CQI reports which have not been transmitted before the second of the two wideband CQI/wideband second PMI reports. Each full cycle of bandwidth parts shall be in increasing order starting from bandwidth part 0 to bandwidth part J−1. The parameter K is configured by higher-layer signaling.

TABLE 14 and TABLE 15 show design examples for WB ($W_{2V}$, $W_{2H}$)+CQI, and SB ($W_{2V}$, $W_{2H}$)+CQI respectively for $N_V$=2 and $N_V$=4. In particular, the sub-sampling methods for WB ($W_{2V}$, $W_{2H}$)+CQI in TABLE 14 and TABLE 15 are identical to those for WB ($W_{2V}$, $W_{2H}$) and WB CQI in TABLE 9 and TABLE 10. SB ($W_{2V}$, $W_{2H}$) is obtained by further sub-sampling WB ($W_{2V}$, $W_{2H}$) as given in TABLE 14 and TABLE 15. Hence, at the sub-band level, PUCCH feedback is coarser than that for WB.

TABLE 14

WB ($W_{2V}$, $W_{2H}$) + CQI and SB ($W_{2V}$, $W_{2H}$) + CQI ($N_V = 2$)

| RI | ($W_{2V}$, $W_{2H}$) | Total number bits ($W_{2V}$, $W_{2H}$) | Total number bits ($W_{2V}$, $W_{2H}$) + CQI |
|---|---|---|---|
| 1 | WB $W_{2V}$: 0, 2 (CW index in Table 1 with v = 1) <br> WB $W_{2H}$: 0-7 ($2^{nd}$ PMI $i_2$ in Table 3) | 4 bits | 8 bits |
| 1 | SB $W_{2V}$: 0, 2 (CW index in Table 1 with v = 1) <br> SB $W_{2H}$: 0-7 ($2^{nd}$ PMI $i_2$ in Table 3) | 4 bits | 8 + L bits <br> (8 + subband selection) |
| 2 | A first set: | 4 bits | 11 bits |
|   | WB $W_{2V}$: 0, 2 (CW index in Table 1 with v = 1) <br> WB $W_{2H}$: 0, 1, 4, 5 ($2^{nd}$ PMI $i_2$ in Table 4) <br> A second set: | | |
|   | WB $W_{2V}$: one of 0, 1, 2 (CW index in Table 2 with v = 2) <br> WB $W_{2H}$: 0-7 ($2^{nd}$ PMI $i_2$ in Table 3) | | |
| 2 | A first set: | 2 bits | 9 + L bits |
|   | SB $W_{2V}$: one of 0, 1, 2, 3 (CW index in Table 2 with v = 1) <br> SB $W_{2H}$: 0, 4 ($2^{nd}$ PMI $i_2$ in Table 4) <br> A second set: | | |
|   | WB $W_{2V}$: one of 0, 1, 2, 3 (CW index in Table 2 with v = 2) <br> SB $W_{2H}$: 0, 4 ($2^{nd}$ PMI $i_2$ in Table 3) | | |

TABLE 15

WB ($W_{2V}$, $W_{2H}$) + CQI and SB ($W_{2V}$, $W_{2H}$) + CQI ($N_V = 4$)

| RI | Subsampling for WB ($W_{2V}$, $W_{2H}$) and SB ($W_{2V}$, $W_{2H}$) | Total number bits | Total number bits ($W_{2V}$, $W_{2H}$) + CQI |
|---|---|---|---|
| 1 | WB $W_{2V}$: 0, 1, 2, 3 (CW index in Table 2 with v = 1) <br> WB $W_{2H}$: 0, 2, 8, 10 ($2^{nd}$ PMI $i_2$ in Table 3) | 4 bits | 8 bits |
| 1 | SB $W_{2V}$: 0, 1, 2, 3 (CW index in Table 2 with v = 1) <br> SB $W_{2H}$: 0, 2, 8, 10 ($2^{nd}$ PMI $i_2$ in Table 3) | 4 bits | 8 + L bits <br> (8 + subband selection) |
| 2 | A first set: | 4 bits | 11 bits |
|   | WB $W_{2V}$: 0, 2 (CW index in Table 2 with v = 1) <br> WB $W_{2H}$: 0, 1, 4, 5 ($2^{nd}$ PMI $i_2$ in Table 4) <br> A second set: | | |
|   | WB $W_{2V}$: one of 16 CW indices in Table 2 with v = 2 <br> WB $W_{2H}$: 0-7 ($2^{nd}$ PMI $i_2$ in Table 4) | | |
| 2 | A first set: | 2 bits | 9 + L bits |
|   | SB $W_{2V}$: one of 16 CW indices in Table 2 with v = 1 <br> SB $W_{2H}$: 0, 4 ($2^{nd}$ PMI $i_2$ in Table 4) <br> A second set: | | |
|   | WB $W_{2V}$: one of 16 CW indices in Table 2 with v = 2 <br> SB $W_{2H}$: 0, 4 ($2^{nd}$ PMI $i_2$ in Table 4) | | |

Regarding SB $W_{2H}$+CQI feedback, TABLE 7 can be used for codebook subsampling. By limiting the SB feedback only on $W_{2H}$, this design achieves better protection of the feedback $W_{2H}$ information than the other SB feedback design in FIG. 8.

2) PUCCH Mode 2-1 for FIG. 1A Design 2

FIG. 9 illustrates another design for PUCCH mode 2-1 with PTI=0 in accordance with one embodiment of the present disclosure. FIG. 9 illustrates PUCCH mode 2-1 Design 2 for FIG. 1A with PTI=0. In FIG. 9 for PTI=0, $W_{1H}$ is transmitted in the same subframes as those for $W_{1H}$ transmission in FIG. 7. WB ($W_{2V}$, $W_{2H}$)+WB CQI and WB $W_{2H}$+CQI alternate in time in those subframes for reporting WB ($W_{2V}$, $W_{2H}$)+CQI in FIG. 7.

FIG. 10 illustrates another design for PUCCH mode 2-1 with PTI=1 in accordance with one embodiment of the present disclosure. FIG. 10 illustrates PUCCH mode 2-1 Design 2 for FIG. 1A with PTI=1. In FIG. 10 for PTI=1, WB ($W_{2V}$, $W_{2H}$)+CQI are transmitted in reporting instances of WB CQI/PMI. SB ($W_{2V}$, $W_{2H}$)+CQI, WB $W_{2H}$+CQI, and SB $W_{2H}$+CQI take turns in time in the same subframes as those for FIG. 8. TABLE 14 and TABLE 15 can be used for sub-sampling for WB ($W_{2V}$, $W_{2H}$)+CQI, and SB ($W_{2V}$, $W_{2H}$)+CQI, respectively for $N_V=2$ and $N_V=4$.

In this design option, the reliability of $W_{2H}$ is improved as compared with design option 1 since sometimes only $W_{2H}$+CQI are transmitted. However, since the feedback frequency of $W_{2V}$ is larger than that in option 1, the reliability of $W_{2V}$ decreases. As discussed earlier, UEs can be more static in the vertical dimension than the horizontal dimension in some scenarios. The reduction on $W_{2V}$ by half may only cause marginal performance degradation.

Figure 1B:
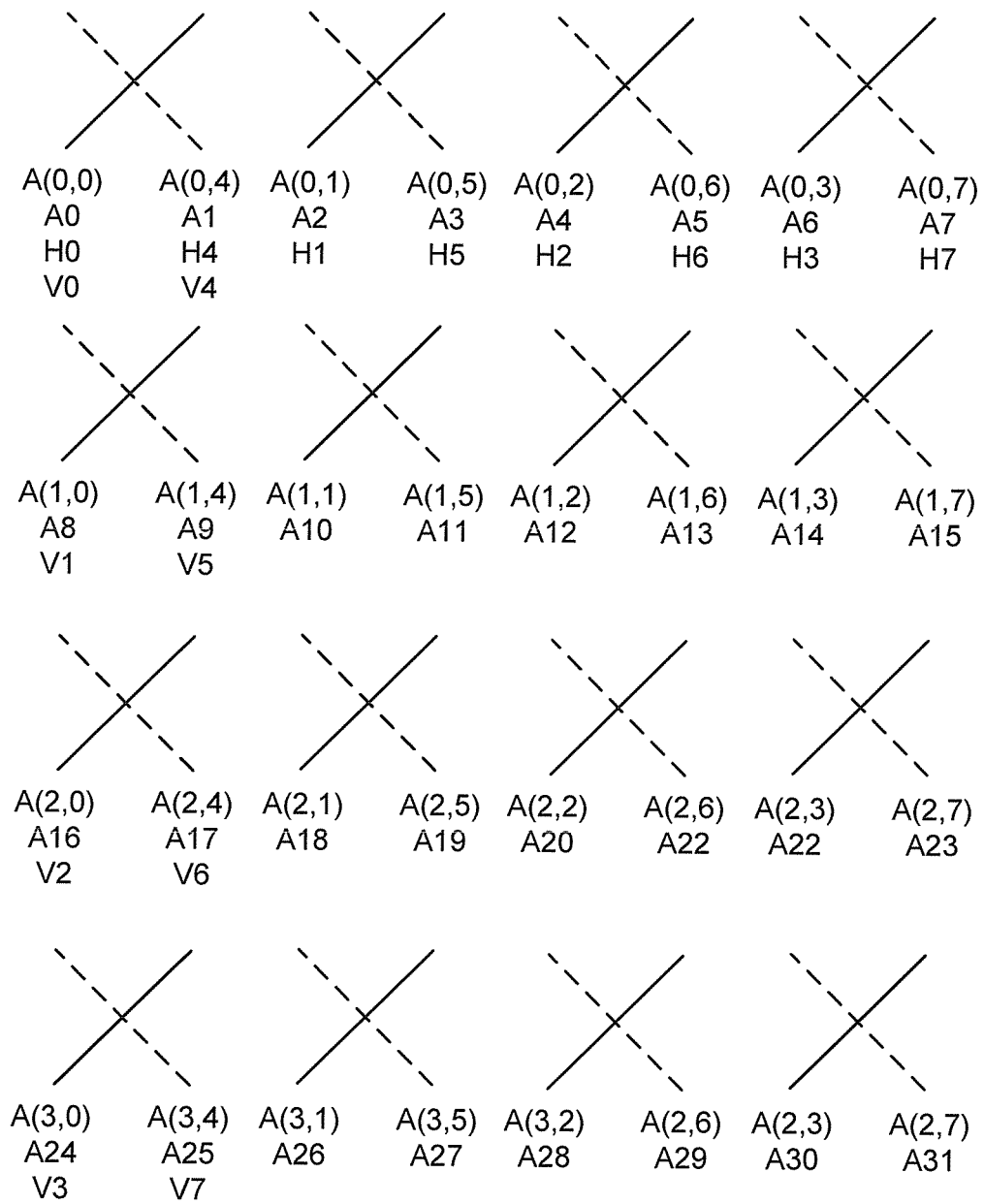
FIG. 1B illustrates a four-row, four-column, cross-polarized, two-dimensional logical antenna array that may be employed within the wireless communication system of FIG. 1.

FIG. 1B illustrates a four-row, four-column, cross-polarized, two-dimensional logical antenna array that may be employed within the wireless communication system of FIG. 1. The 2D logical antenna port array of FIG. 1B comprises $N_{col}=4$ columns of cross-polarized (x-pol) antenna sub-arrays, wherein each column of x-pol sub-arrays comprises $N_{row}=4$ sets of x-pol antenna elements. Although FIG. 1B has specific number of rows and columns, the embodiments associated with FIG. 1B can be used for any arbitrary number of rows and columns.

In some embodiments, the 32 antenna ports in FIG. 1B are indexed as $A(r, 0), A(r, 1), \ldots, A(r, 7), A(1,0)$, wherein r=0, 1, 2, 3 and $A(r, 0), A(r, 1), \ldots, A(r, 7)$ are for 8 antenna ports in a r-th row. Correspondingly, a UE is configured with $N_{row}$ sets of CSI-RS: a first set comprising $A(0,0), A(0,1), \ldots, A(0,7)$; and a second set comprising $A(1,0), A(1,1), \ldots, A(1,7)$. Correspondingly, UE is configured with $N_{row}$ parameter sets of {resourceConfig, subframeConfig}, which specifies the time-frequency location of the $N_{row}$ sets of NZP CSI-RS.

In some embodiments, the 32 antenna ports in FIG. 1B are indexed with A0,A1,A2, ..., A31, wherein positive integers are sequentially assigned starting from 1 along the elements in a first row, and then continuously increase along the elements in a second row, etc. Correspondingly, a UE is configured with one set of CSI-RS A0,A1,A2, ..., A31.

In some embodiments, out of the 32 antenna ports in FIG. 1B, 8 antenna ports in a first row are indexed with H0, H1, ..., H7, the assigned numbers wherein non-negative integers are sequentially assigned starting from 0 along the elements with a first polarization in a first row and then along the elements with a second polarization in the first row.

In some embodiments, out of the 32 antenna ports in FIG. 1B, 4 antenna ports with a same polarization in a first column are indexed with H0, H1,H2,H3.

In some embodiments, out of the 16 antenna ports in FIG. 1B, 4 antenna ports in a first column are indexed with V0,V1, ..., V7, wherein V0,V1, V2 and V3 are with a first polarization and V4,V5,V6 and V7 are with a second polarization.

In some embodiments, a UE is configured to report horizontal-channel PMI (H-PMI) and vertical channel PMI (V-PMI), wherein H-PMI and V-PMI represent a precoding matrix respectively in azimuth and elevation domains. The precoding matrices corresponding to H-PMI and V-PMI are respectively referred to as H and V precoding matrix (or vector).

For facilitating H-PMI and V-PMI feedback, the UE is configured with N parameter sets of {resourceConfig, subframeConfig}, which specifies the time-frequency location of N groups of nonzero-power (NZP) channel-state-information reference-signals (CSI-RS), wherein the antenna ports associated with CSI-RS can be constructed according to some embodiments of the current disclosure.

In one example, one group of CSI-RS is provided for estimating $W_H$ and the other is provided for estimating $W_V$.

Figure 1C:
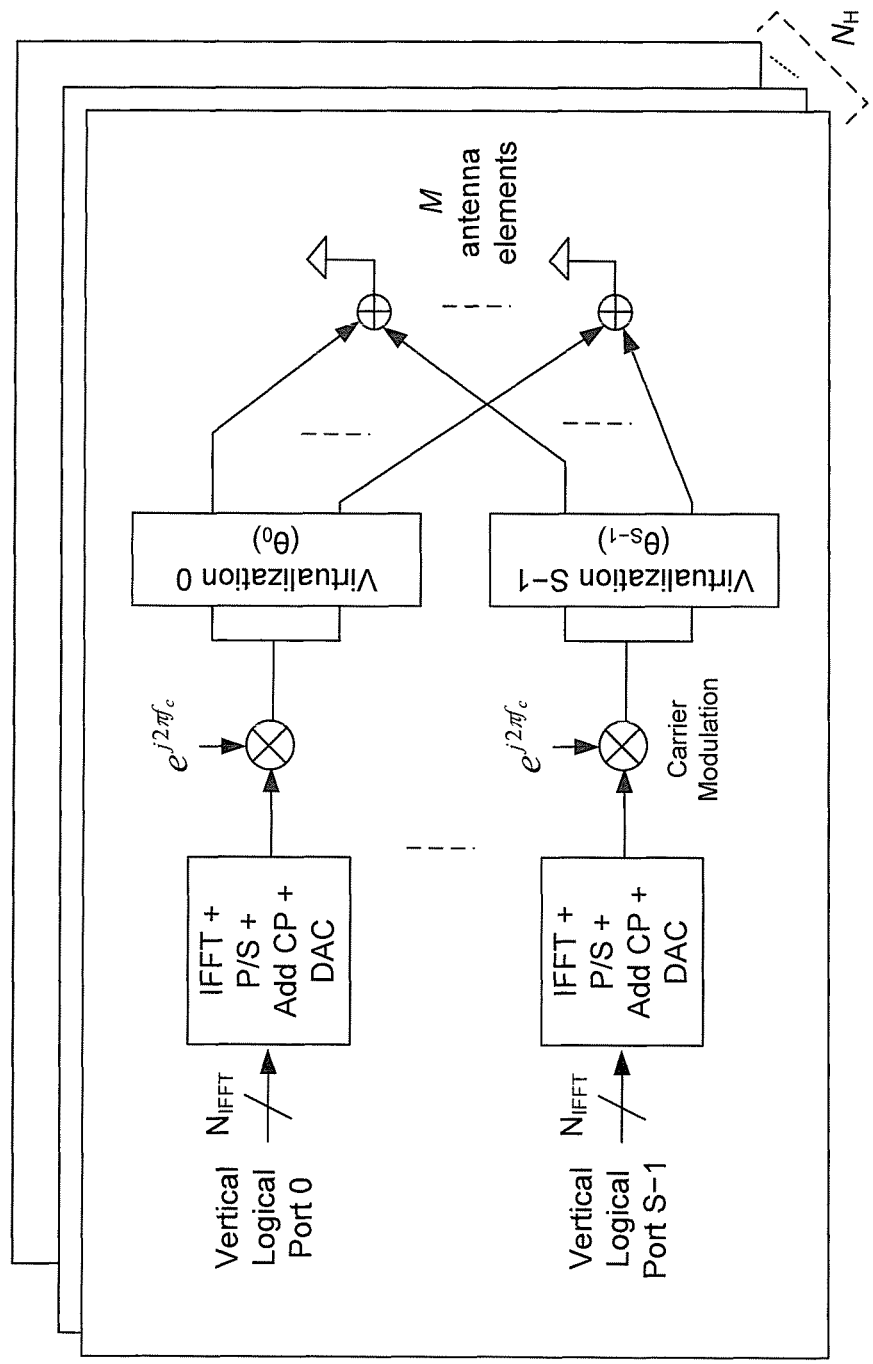
FIG. 1C illustrates logical port to antenna port mapping that may be employed within the wireless communication system of FIG. 1 according to some embodiments of the current disclosure.

FIG. 1C illustrates logical port to antenna port mapping that may be employed within the wireless communication system of FIG. 1 according to some embodiments of the current disclosure. In the figure, transmission (Tx) signals on each logical port is fed into an antenna virtualization matrix (e.g., of a size M×1), output signals of which are into a set of M physical antenna ports. In some embodiments, M corresponds to a total number of antenna elements on a substantially vertical axis. In some embodiments, M corresponds to a ratio of a total number of antenna elements to a variable S, on a substantially vertical axis, wherein M and S are each chosen to be a positive integer.

In some embodiments, both vertical and horizontal codebooks ($W_H$ and $W_V$) have double codebook structure: the codebooks $W_H$ and $W_V$ are such that $W_H = W_{1H} W_{2H}$ and $W_V = W_{2V} W_{2V}$, wherein Release-10 8-Tx inner CB in Table 3 is used both for the vertical inner CB $W_{1V}$ and the horizontal inner CB $W_{1H}$.

Inner Codebook $W_1$

In some embodiments, the vertical and horizontal inner codebooks $W_{1V}$ and $W_{1H}$ can be expressed as a block diagonal matrix defined as follows:

$$W_{1V} = \left\{ \begin{pmatrix} X_V(i_{1V}) & 0 \\ 0 & X_V(i_{1V}) \end{pmatrix}, i_{1V} = 0, 1, \ldots, 15 \right\},$$

$$W_{1H} = \left\{ \begin{pmatrix} X_H(i_{1H}) & 0 \\ 0 & X_H(i_{1H}) \end{pmatrix}, i_{1H} = 0, 1, \ldots, 15 \right\},$$

where $W_{1V}$ and $W_{1H}$ are selected to be a 4×4 matrix X(i) defined as in the following:

$$X(i) = [v_{2i \bmod 32} \; v_{(2i+1) \bmod 32} \; v_{(2i+2) \bmod 32} \; v_{(2i+3) \bmod 32}]$$

with $v_n = [1 \; e^{j2\pi n/32} \; e^{j2\pi 2n/32} \; e^{j2\pi 3n/32}]^T$ and with i=0,1, ..., 15.

Then, the composite inner codebook $W_1$ is constructed as follows:

$$W_1 = \left\{ \begin{pmatrix} X_V(i_{1V}) \circ X_H(i_{1H}) & 0 \\ 0 & X_V(i_{1V}) \circ X_H(i_{1H}) \end{pmatrix} \right\}$$

where the operator ∘ denotes the column-wise Kronecker product of two matrices, also called the Khatri-Rao product, and where $W_1$ can therefore be rewritten as:

$$W_1 = [v_{2i_{1V} \bmod 32} \otimes v_{2i_{1H} \bmod 32} \; v_{(2i_{1H}+1) \bmod 32} \cdots$$
$$v_{(2i_{1V}+3) \bmod 32} \otimes v_{(2i_{1H}+3) \bmod 32}].$$

Here, the matrix $X_V(i_{1V}) \circ X_H(i_{1H})$ consists of 16 beams of size 16×1, wherein the 16 beams are all of the Kronecker product of the 4-H and the 4 V-beams. Hence, the size of the FD-MIMO inner codebook matrix $W_1$ is 32×32. The number of distinct $W_1$ codewords is 256 and the number of bits for $W_1$ is 8 bits.

Outer Codebook $W_2$

In some embodiments, $W_2$ is constructed as in the following. Define $e_i$ as a 16×1 column vector whose entries are all zero except for the i-th entry being 1. For Rank 1, the codebook (precoding matrix) $W_2$ is given by $$W_2 = \left\{ \begin{bmatrix} Y_1 \\ Y_1 \end{bmatrix}, \begin{bmatrix} Y_1 \\ -Y_1 \end{bmatrix}, \begin{bmatrix} Y_1 \\ jY_1 \end{bmatrix}, \begin{bmatrix} Y_1 \\ -jY_1 \end{bmatrix} \right\},$$

where $Y_1 \in \{e_1 \; e_2 \ldots e_{16}\}$ corresponds to the beam selection. The size of the outer codebook $W_2$ is 16×4=64 (6 bits). For each codeword in $W_2$, the beam selection index i for i=1, 2, ..., 16 can be decomposed into two indices (m, m') with i=4m+m'+1, where m is the vertical beam selection index with 0≤m≤3 and m' is the horizontal beam selection index with 0≤m'≤3. TABLE 16 shows the mappings between beam selection vectors $e_i$ (or index i) and the vertical beam selection index m and the horizontal beam selection index m', respectively. Each $Y_1 \in \{e_1 \; e_2 \ldots e_{16}\}$ is mapped onto a unique pair of (m, m') according to TABLE 16. In the rank-1 case, the co-phasing factor denoted by $\phi_n$ is $e^{j\pi n/2}$, for n=0,1,2,3.

TABLE 16

Mapping between the beam selection vector $e_i$ and the horizontal and vertical beam selection indices m and m'

| | Beam selection vector $e_i$ | | | | | | | | | | | | | | | |
|---|---|---|---|---|---|---|---|---|---|---|---|---|---|---|---|---|
| | $e_1$ | $e_2$ | $e_3$ | $e_4$ | $e_5$ | $e_6$ | $e_7$ | $e_8$ | $e_9$ | $e_{101}$ | $e_{11}$ | $e_{12}$ | $e_{13}$ | $e_{14}$ | $e_{15}$ | $e_{16}$ |
| m index | 0 | 0 | 0 | 0 | 1 | 1 | 1 | 1 | 2 | 2 | 2 | 2 | 3 | 3 | 3 | 3 |
| m' index | 0 | 1 | 2 | 3 | 0 | 1 | 2 | 3 | 0 | 1 | 2 | 3 | 0 | 1 | 2 | 3 |

For $W_2$, the beam selection indices m and m', and co-phasing factors $\phi_n$ are determined by two indices, namely, $i_{2V}$ and $i_{2H}$. TABLE 17 illustrates one method to map $i_{2V}$ and $i_{2H}$ to m, m' and n in the rank-1 case. The vertical beam selection index m is indicated by $i_{2V}$. The horizontal beam selection index m' and co-phasing factors $\{+1, -1, +j, -j\}$ (4 states) are jointly encoded and indicated by $i_{2H}$.

TABLE 17

$i_{2V}$ and $i_{2H}$ mapping (Rank 1)

| $i_{2V}$ indices | m | $i_{2H}$ indices | {m', n} |
|---|---|---|---|
| 0 | 0 | 0, 1, 2, 3 | {0, 0} {0, 1} {0, 2} {0, 3} |
| 1 | 1 | 4, 5, 6, 7 | {1, 0} {1, 1} {1, 2} {1, 3} |
| 2 | 2 | 8, 9, 10, 11 | {2, 0} {2, 1} {2, 2} {2, 3} |
| 3 | 3 | 12, 13, 14, 15 | {3, 0} {3, 1} {3, 2} {3, 3} |

TABLE 18 clarifies the mapping from composite PMI $(i_{1V}, i_{1H}, i_{2V}, i_{2H})$ to m, m' and n, wherein the first V-PMI $i_{1V} = \{0, \ldots, 15\}$, the second V-PMI $i_{2V} = \{0, \ldots, 3\}$, the first H-PMI $i_{1H} = \{0, \ldots, 15\}$, and the second H-PMI $i_{2H} = \{0, \ldots, 15\}$.

In some embodiments, the precoding vector to derive rank-1 CQI is constructed by:

$$w_{m,m',n} = \frac{1}{\sqrt{32}} \begin{bmatrix} v_m \otimes v_{m'} \\ \varphi_n v_m \otimes v_{m'} \end{bmatrix},$$

wherein $v_m$ is a first precoding vector selected from a first codebook, $v_{m'}$ is a second precoding vector selected from a second codebook, and $\phi_n$ is a co-phase.

In one example, the first codebook for $v_m$ is an $N_1$-Tx DFT codebook oversampled with oversampling factor $o_1$ and the second codebook for $v_{m'}$ is an $N_2$-Tx DFT codebook oversampled with oversampling factor $o_2$.

In one method, a UE is configured to report information regarding m, m', and n.

In one example, m, m', and n are determined according to TABLE 17 and equivalently according to TABLE 18, and the UE is configured to report one or more of $i_{1V}$, $i_{1H}$, $i_{2V}$, and $i_{2H}$.

TABLE 18

Codebook for 1-layer CSI Reporting

| | | $i_{2H}$ | |
|---|---|---|---|
| 0 | 1 | 2 | 3 |
| $w_{2i_1V,2i_2V,2i_1H,0}$ | $w_{2i_1V,2i_2V,2i_1H,1}$ | $w_{2i_1V,2i_2V,2i_1H,2}$ | $w_{2i_1V,2i_2V,2i_1H,3}$ |
| 4 | 5 | 6 | 7 |

TABLE 18-continued

Codebook for 1-layer CSI Reporting

| $w_{2i_1V,2i_2V,2i_1H+1,0}$ | $w_{2i_1V,2i_2V,2i_1H+1,1}$ | $w_{2i_1V,2i_2V,2i_1H+1,2}$ | $w_{2i_1V,2i_2V,2i_1H+1,3}$ |
|---|---|---|---|
| 8 | 9 | 10 | 11 |
| $w_{2i_1V,2i_2V,2i_1H+2,0}$ | $w_{2i_1V,2i_2V,2i_1H+2,1}$ | $w_{2i_1V,2i_2V,2i_1H+2,2}$ | $w_{2i_1V,2i_2V,2i_1H+2,3}$ |
| 12 | 13 | 14 | 15 |
| $w_{2i_1V,2i_2V,2i_1H+3,0}$ | $w_{2i_1V,2i_2V,2i_1H+3,1}$ | $w_{2i_1V,2i_2V,2i_1H+3,2}$ | $w_{2i_1V,2i_2V,2i_1H+3,3}$ |

$$w_{m,m',n} = \frac{1}{\sqrt{32}} \begin{bmatrix} v_m \otimes v_{m'} \\ \varphi_n v_m \otimes v_{m'} \end{bmatrix}$$

For a given pair of $(i_{1V}, i_{2V})$, $w_{m,m',n}$ is constructed by the indices $(i_{1H}, i_{2H})$ in the same manner as TABLE 4. The indices m, m' and n are employed to select the (rank-1) precoding matrix that includes a first column comprising a first row partition and a second row partition, the first row partition containing (as indicated by the formula in TABLE 18] a Kronecker product of at least first and second precoding vectors $v_m$ and $v_{m'}$ and the second row partition containing a Kronecker product of a first term (the product of a co-phasing factor $\phi_n$ and the first precoding vector $v_m$) and a second term (the second precoding vector $v_{m'}$). As discussed above, the first precoding vector $v_m$ is selected from a first codebook and the second precoding vector $v_{m'}$ is selected from a second codebook. It is noted that the roles of H and V in these embodiments can be swapped, without departing from the principles of the current disclosure.

In some embodiments, when the UE is configured with TABLE 3 or TABLE 17 for $W_{2H}$ (or $i_{2H}$) feedback, sub-sampling of $W_{2H}$ is $\{0,2,4,6,8,10,12,14\}$ when the most recently reported RI is 1, in which case all the four beams with two co-phasing factors $\{0, \pi\}$ are selected. The number of beams is used to provide the long-term wideband coverage for UEs while the co-phasing factors are used to adjust beams to be adaptive the short-term frequency selectivity of the channel. Hence, more bits are allocated to beam selection indices than the co-phasing factors.

In some embodiments, when the UE is configured with TABLE 3 or TABLE 17 for $W_{2H}$ (or $i_{2H}$) feedback, sub-sampling of $W_{2H}$ is $\{0,2,4,6,8,10,12,14\}$ when the most recently reported RI is 1, in which case all the four co-phasing factors corresponding to a first and a second beam indices are selected. As the DFT beams are already oversampled, losing the two beam indices is not likely to introduce significant performance loss.

In some embodiments, eNB transmits two data streams to a UE along two different spatial directions on the same time-frequency resource. In order for the UE to help eNB's determine these two directions for the DL transmissions, the UE reports a rank-2 PMI indicating a composite rank-2 precoding matrix comprising two column vectors, wherein each column vector is associated with a direction whose signal path is strong for the UE. Each column vector can be represented by a Kronecker product of horizontal and vertical (or azimuth and elevation) precoding vectors. In some scenarios, angle spread in elevation domain is much smaller than angle spread in azimuth domain; in some other scenarios, angle spread in azimuth domain is much smaller than angle spread in elevation domain.

In one example scenario where elevation spread is much smaller than azimuth spread, a UE is likely to receive best rank-2 beams in a horizontal plane. When the most recently reported rank is 2 (RI=2), it is proposed that the UE should report rank-2 PMI corresponding to a composite rank-2 precoding matrix constructed by a Kronecker product of a rank-2 H precoding matrix and a rank-1 V precoding vector. It is noted that the role of H and V in these embodiments can be swapped without departing from the principles of the current disclosure.

In some embodiments, for rank-2, the codebook (precoding matrix) $W_2$ is constructed by $$W_2 = \begin{bmatrix} Y_1 & Y_2 \\ \varphi_n Y_1 & -\varphi_n Y_2 \end{bmatrix},$$

wherein $(Y_1, Y_2) = (e_{i1}, e_{i2})$. For a selected $(Y_1, Y_2)$ pair, two rank-2 co-phasing factors $\varphi_n$ can be selected, either $\varphi_n=1$ or $j$.

In some embodiments, a UE can be configured to report rank-2 PMI, wherein the rank-2 PMI indicates a constant direction (or precoding vector) in either of azimuth or elevation domain and two directions (or two precoding vectors) in the other domain.

For example, eNB may configure a UE to report rank-2 PMI, wherein a common beam selection index m is used for constructing a vertical precoding vector, and two separate beam selection indices m', m" are used for constructing the two horizontal precoding vectors, wherein the composite precoding matrix is constructed by taking Kronecker product of the vertical precoding vector and each of the two horizontal precoding vectors. In this case, $(Y_1, Y_2) = (e_{i1}, e_{i2})$ can be determined $i_1 = 4m+m'+1$ and $i_2 = 4m+m''+1$. In this case, eNB may utilize channel-reciprocity channel estimation based upon uplink signal estimation, to figure out such a channel condition.

A similar example can be constructed for the case where azimuth domain channel spread is smaller than elevation domain spread, in which case a UE is configured to feed back a common beam selection index for a horizontal precoding vector, and two beam selection indices for two vertical precoding vectors.

In some embodiments, $(i_{2V}, i_{2H})$ are mapped to m, m', m" and n, wherein vertical beam selection index m is mapped by $i_{2V}$ and two horizontal beam selection indices (m', m") and the co-phasing factor index n are jointly indicated by $i_{2H}$, wherein $i_{2V} = \{0, \ldots, 3\}$ and $i_{2H} = \{0, \ldots, 15\}$. In this case, for a given second V-PMI $i_{2V}$, the second H-PMI $i_{2H}$ maps to a rank-2 precoding matrix according to Rel-10 rank-2 codebook table, i.e., TABLE 4. Hence, in order to calculate and report H-PMI, most of the legacy UE implementation deriving 8-Tx PMI can be used.

In some embodiments $(i_{2V}, i_{2H})$ are mapped to m, m', m" and n, wherein vertical beam selection index m is mapped by $i_{2V}$ and two horizontal beam selection indices (m', m") and the co-phasing factor index n are jointly indicated by $i_{2H}$, wherein $i_{2V} = \{0, \ldots, 7\}$ and $i_{2H} = \{0, \ldots, 7\}$. In this case, for both second V-PMI $i_{2V}$ and second H-PMI $i_{2H}$, feedback payload size is the same, which is 3 bits. This design enables that the two PUCCH reports respectively comprising $i_{2V}$ and $i_{2H}$ are received with same reliability.

In some embodiments, for rank 2 the codebook (precoding matrix) $W_2$ is given by $$W_2 = \begin{bmatrix} Y_1 & Y_2 \\ Y_1 & -Y_2 \end{bmatrix} \begin{bmatrix} Y_1 & Y_2 \\ jY_1 & -jY_2 \end{bmatrix},$$

where $(Y_1, Y_2) \in \{(e_i, e_i): i=1, \ldots, 16\} \cup \{(e_l, e_{l+1}), (e_{l+1}, e_{l+2}), (e_l, e_{l+3}), (e_{l+1}, e_{l+3}), l=1,5,9,10\}$. According to this construction, $(Y_1, Y_2)$ can have 32 different values, wherein all four different vertical beams indicated by $i_{1V}$ can be selected, and for a given selected vertical beam, 8 pairs of horizontal beams can be selected to comprise two beams for 8 rank-2 precoding matrices.

TABLE 19 lists 32 selected pairs of beam selection indices for this CB construction in the rank 2 case, in which shaded regions are used to indicate selected beam index pairs. According to TABLE 19, with referring to TABLE 16, for each rank-2 precoding matrix a single vertical beam selection index m and two horizontal beam selection indices m' and m" are used. Each $(Y_1, Y_2)$ located in the same block diagonal box has the same vertical beam selection index.

TABLE 19

The 32 pairs of the beam selection indices in CB (Rank = 2)

| $(Y_1,Y_2)$ | $e_1$ | $e_2$ | $e_3$ | $e_4$ | $e_5$ | $e_6$ | $e_7$ | $e_8$ | $e_9$ | $e_{10}$ | $e_{11}$ | $e_{12}$ | $e_{13}$ | $e_{14}$ | $e_{15}$ | $e_{16}$ |
|---|---|---|---|---|---|---|---|---|---|---|---|---|---|---|---|---|
| $e_1$ | | | | | | | | | | | | | | | | |
| $e_2$ | | | | | | | | | | | | | | | | |
| $e_3$ | | | | | | | | | | | | | | | | |
| $e_4$ | | | | | | | | | | | | | | | | |
| $e_5$ | | | | | | | | | | | | | | | | |
| $e_6$ | | | | | | | | | | | | | | | | |
| $e_7$ | | | | | | | | | | | | | | | | |
| $e_8$ | | | | | | | | | | | | | | | | |
| $e_9$ | | | | | | | | | | | | | | | | |
| $e_{10}$ | | | | | | | | | | | | | | | | |
| $e_{11}$ | | | | | | | | | | | | | | | | |
| $e_{12}$ | | | | | | | | | | | | | | | | |
| $e_{13}$ | | | | | | | | | | | | | | | | |
| $e_{14}$ | | | | | | | | | | | | | | | | |
| $e_{15}$ | | | | | | | | | | | | | | | | |
| $e_{16}$ | | | | | | | | | | | | | | | | |

TABLE 20 illustrates a mapping from $(i_{2V}, i_{2H})$ to m, m', m" and n according to some embodiments of the present disclosure, wherein vertical beam selection index m (2 bits) is mapped by $i_{2V}$ and horizontal beam selection indices (m', m") and the co-phasing factor index n are jointly indicated by $i_{2H}$.

TABLE 20

$i_{2V}$ and $i_{2H}$ mapping method (Rank 2)

| $i_{2V}$ CW indices | m | $i_{2H}$ CW indices | (m', m", n) |
|---|---|---|---|
| 0 | 0 | 0, 1, 2, 3 | (0, 0, 0) (0, 0, 1) (1, 1, 0) (1, 1, 1) |
| 1 | 1 | 4, 5, 6, 7 | (2, 2, 0) (2, 2, 1) (3, 3, 0) (3, 3, 1) |

TABLE 20-continued i$_{2V}$ and i$_{2H}$ mapping method (Rank 2)

| i$_{2V}$ CW indices | m | i$_{2H}$ CW indices | (m', m'', n) | | | |
|---|---|---|---|---|---|---|
| 2 | 2 | 8, 9, 10, 11 | (0, 1, 0) | (0, 1, 1) | (1, 2, 0) | (1, 2, 1) |
| 3 | 3 | 12, 13, 14, 15 | (0, 3, 0) | (0, 3, 1) | (1, 3, 0) | (1, 3, 1) |

TABLE 21 clarifies the mapping from composite PMI (i$_{1V}$, i$_{1H}$, i$_{2V}$, i$_{2H}$) to m, m', m'' and n, wherein the first V-PMI i$_{1V}$={0, ... , 15}, the second V-PMI i$_{2V}$={0, ... , 3}, the first H-PMI i$_{1H}$={0, ... , 15}, and the second H-PMI i$_{2H}$={0, ... , 15}.

In some embodiments, the precoding vector used for deriving rank-2 CQI is constructed by:

$$W^{(2)}_{m,m',m'',n} = \frac{1}{8} \begin{bmatrix} v_m \otimes v_{m'} & v_m \otimes v_{m''} \\ \varphi_n v_m \otimes v_{m'} & -\varphi_n v_m \otimes v_{m''} \end{bmatrix},$$

wherein $v_m$ is a first precoding vector selected from a first codebook, $v_{m'}$ and $v_{m''}$ are a second and a third precoding vector selected from a second codebook, and $\phi_n$ is a co-phase.

In one example, the first codebook for $v_m$ is an $N_1$-Tx DFT codebook oversampled with oversampling factor $o_1$ and the second codebook for $v_{m'}$ and $v_{m''}$ is an $N_2$-Tx DFT codebook oversampled with oversampling factor $o_2$.

In one method, a UE is configured to report information regarding m, m', m'', and n.

In one example, m, m', m'' and n are determined according to TABLE 17, and equivalent according to TABLE 21, and UE is configured to report i$_{1V}$, i$_{1H}$, i$_{2V}$, and i$_{2H}$.

TABLE 21

Codebook for 2-layer CSI Reporting i$_{2H}$

| 0 | 1 | 2 | 3 |
|---|---|---|---|
| w$_{2i_{1V}+i_{2V},2i_{1H},2i_{1H},0}$ | w$_{2i_{1V}+i_{2V},2i_{1H},2i_{1H},1}$ | w$_{2i_{1V}+i_{2V},2i_{1H}+1,2i_{1H},0}$ | w$_{2i_{1V}+i_{2V},2i_{1H}+1,2i_{1H}+1,1}$ |
| 4 | 5 | 6 | 7 |
| w$_{2i_{1V}+i_{2V},2i_{1H}+2,2i_{1H},0}$ | w$_{2i_{1V}+i_{2V},2i_{1H}+2,2i_{1H},1}$ | w$_{2i_{1V}+i_{2V},2i_{1H}+3,2i_{1H},0}$ | w$_{2i_{1V}+i_{2V},2i_{1H}+3,2i_{1H},1}$ |
| 8 | 9 | 10 | 11 |
| w$_{2i_{1V}+i_{2V},2i_{1H},2i_{1H}+1,0}$ | w$_{2i_{1V}+i_{2V},2i_{1H},2i_{1H}+1,1}$ | w$_{2i_{1V}+i_{2V},2i_{1H}+1,2i_{1H}+2,0}$ | w$_{2i_{1V}+i_{2V},2i_{1H}+1,2i_{1H}+2,1}$ |
| 12 | 13 | 14 | 15 |
| w$_{2i_{1V}+i_{2V},2i_{1H},2i_{1H}+3,0}$ | w$_{2i_{1V}+i_{2V},2i_{2H},2i_{2H}+3,1}$ | w$_{2i_{1V}+i_{2V},2i_{2H}+1,2i_{2H}+3,0}$ | w$_{2i_{1V}+i_{2V},2i_{2H}+1,2i_{2H}+3,1}$ |

$$w_{m,m',m'',n} = \frac{1}{8} \begin{bmatrix} v_m \otimes v_{m'} & v_m \otimes v_{m''} \\ \varphi_n v_m \otimes v_{m'} & -\varphi_n v_m \otimes v_{m''} \end{bmatrix}$$

In some embodiments, for the rank-2 case, when the UE is configured with TABLE 20 for W$_{2H}$ (or i$_{2H}$) feedback, subsampling of W$_{2H}$ is {0,2,4,6,8,10,12,14} when the most recently reported RI is 2, in which case all the eight beam selection pairs and a single co-phasing factor are chosen. The rationale behind such choices is that the number of beam selection pairs could be more crucial for the rank-2 beamforming performance.

In some embodiments, for the rank-2 case, when the UE is configured with TABLE 20 for W$_{2H}$ (or i$_{2H}$) feedback, subsampling of W$_{2H}$ is {0,1,2,3,4,5,6,7} when the most recently reported RI is 2, in which case four beam selection pairs with the same beams and both co-phasing factors are chosen. The rationale behind such choices is that the number of co-phasing factors could be more crucial for the rank-2 beamforming performance.

TABLE 22 illustrates a mapping from (i$_{2V}$, i$_{2H}$) to m, m', m'' and n according to some embodiments of the present disclosure, wherein vertical beam selection index m (2 bits) and co-phasing factor index n are mapped by i$_{2V}$ and horizontal beam selection indices (m', m'') are jointly indicated by i$_{2H}$. Here the first V-PMI is i$_{1V}$={0, ... , 15}, the second V-PMI is i$_{2V}$={0, ... , 7}, the first H-PMI is i$_{1H}$={0, ... , 15}, and the second H-PMI is i$_{2H}$={0, ... , 7}. The precoding matrix used for deriving rank-2 CQI is constructed by $$W^{(2)}_{m,m',m'',n} = \frac{1}{8} \begin{bmatrix} v_m \otimes v_{m'} & v_m \otimes v_{m''} \\ \varphi_n v_m \otimes v_{m'} & -\varphi_n v_m \otimes v_{m''} \end{bmatrix}.$$

TABLE 22 i$_{2V}$ and i$_{2H}$ mapping method (Rank 2)

| i$_{2V}$ indices | (m, n) | i$_{2H}$ indices | (m', m'') |
|---|---|---|---|
| 0 | (0, 0) | 0 | (0, 0) |
| 1 | (0, 1) | 1 | (1, 1) |
| 2 | (1, 0) | 2 | (2, 2) |

TABLE 22-continued i$_{2V}$ and i$_{2H}$ mapping method (Rank 2)

| i$_{2V}$ indices | (m, n) | i$_{2H}$ indices | (m', m'') |
|---|---|---|---|
| 3 | (1, 1) | 3 | (3, 3) |
| 4 | (2, 0) | 4 | (0, 1) |

TABLE 22-continued i$_{2V}$ and i$_{2H}$ mapping method (Rank 2)

| i$_{2V}$ indices | (m, n) | i$_{2H}$ indices | (m', m'') |
|---|---|---|---|
| 5 | (2, 1) | 5 | (1, 2) |
| 6 | (3, 0) | 6 | (0, 3) |
| 7 | (3, 1) | 7 | (3, 0) |

PUCCH Mode 1-1 Submode 1

FIG. 11 illustrates PUCCH feedback over multiple subframes according to some embodiments of the present disclosure, when the UE is configured with PUCCH mode 1-1 submode 1. In RI reporting instances, RI and ($W_{1V}$, $W_{1H}$) are jointly encoded and are transmitted. In CQI/PMI reporting instances, WB ($W_{2V}$, $W_{2H}$)+CQI are transmitted. In this design, $W_{1V}$ and $W_{2V}$ are respectively transmitted together with $W_{1H}$ and $W_{2H}$, and hence the overall PMI decoding reliability may get degraded if full PMI is transmitted for V- and H-PMI.

In some embodiments, a UE is configured to select and report $W_{1V}$, which is selected from a subsampled set out of 0, 1, . . . , 15, in order to keep the payload of a PUCCH report small, such that the decoding reliability is good. In one method, uniform subsampling is applied; for example, when the subsampling set size is 4, the subsampled values are {0, 4, 8, 12}.

In some embodiments, $W_{1V}$ is subsampled such that typical values for zenith angle of departure (ZoD) are still kept in the subsampled set. When a UE is on the ground plane and the UE-BS distance is far enough, the zenith angle of departure (θ) converges to 90°. Therefore it is important to keep a PMI index representing θ=90°, which corresponds to $i_{1V}$=0. On the other hand, in typical macro scenarios, base stations are above UEs on the average, and hence, it would be important to represent those zenith angles well above 90°, e.g., 120°. When ZoD is θ, optimal beam steering angle v is determined by $$v = \frac{2\pi d_V}{\lambda_c} \cos \theta_0.$$

On the other hand, a first DFT beam angle corresponding to $W_{1V}$ ($i_{1V}$) is $$\frac{2\pi i_{1V}}{32}.$$

Then, given $i_{1V}$=0, 4, 8, 12, corresponding ZoD's can be obtained as shown in TABLE 23.

TABLE 23

ZoD angles corresponding to W1V PMI

| $W_{1V}$ ($i_{1V}$) | A first DFT beam angle ($2\pi i_{1V}$/32) | θ with $d_V$ = 0.5λ | θ with $d_V$ = λ |
|---|---|---|---|
| 0 | 0 | π/2 (90°) | π/2 (90°) |
| 4 | π/2 | π/3 (120°) | 1.32 (108°) |
| 8 | π | 0 (0°) | π/3 (120°) |
| 12 | 3π/2 = −π/2 | 2π/3 (60°) | 0.72 (139°) |

In one method, {0, 4} is used as the subsampled values of $W_{1V}$. In another method, {0, 8} is used as the subsampled values of $W_{1V}$. In another method, the subsampled values of include 0 and x, wherein x∈{0, 1, 2, . . . , 15} is configured by higher-layer.

TABLE 24 illustrates a method to jointly encode of RI and ($W_{1V}$, $W_{1H}$) according to some embodiments of the present disclosure. For the vertical and the horizontal $W_1$ feedback, uniform subsampling is applied with a same subsampling factor, which is 4, in order to keep the payload small so that the joint feedback can be reliably received at the eNB.

TABLE 24

RI and ($W_{1V}$, $W_{1H}$) Joint Encoding

| RI | RI and ($W_{1V}$, $W_{1H}$) joint encoding | Total number bits |
|---|---|---|
| 1 | $W_{1V}$: 0, 4, 8, 12 (1$^{st}$ PMI i$_1$ in Table 3) $W_{1H}$: 0, 4, 8, 12 (1$^{st}$ PMI i$_1$ in Table 3) | 4 bits |
| 2 | $W_{1V}$: 0, 4, 8, 12 (1$^{st}$ PMI i$_1$ in Table 4) $W_{1H}$: 0, 4, 8, 12 (1$^{st}$ PMI i$_1$ in Table 4) | 4 bits |
| | Total number bits of RI + ($W_{1V}$, $W_{1H}$) for ranks 1-2 | 5 bits |

TABLE 25 illustrates another method to jointly encode of RI and ($W_{1V}$, $W_{1H}$) according to some embodiments of the present disclosure. For the horizontal $W_1$ feedback, uniform subsampling is applied with subsampling factor 2; on the other hand for the vertical $W_1$ feedback, two indices are carefully chosen such that the elevation angles found in typical deployment scenarios are well represented.

TABLE 25

RI and ($W_{1V}$, $W_{1H}$) Joint Encoding Method 2

| RI | RI and ($W_{1V}$, $W_{1H}$) joint encoding | Total number bits |
|---|---|---|
| 1 | $W_{1V}$: 0, 8 (1$^{st}$ PMI i$_1$ in Table 3) $W_{1H}$: 0, 2, 4, 6, 8, 10, 12, 14 (1$^{st}$ PMI i$_1$ in Table 3) | 4 bits |
| 2 | $W_{1V}$: 0, 8 (1$^{st}$ PMI i$_1$ in Table 4) $W_{1H}$: 0, 2, 4, 6, 8, 10, 12, 14 (1$^{st}$ PMI i$_1$ in Table 4) | 4 bits |
| | Total number bits of the joint codebook RI + ($M_{1V}$, $W_{1H}$) for ranks 1-2 | 5 bits |

TABLE 26 illustrates a method to encode ($W_{2V}$, $W_{2H}$) and WB CQI feedback according to some embodiments of the present disclosure.

TABLE 26

($W_{2V}$, $W_{2H}$) and WB CQI feedback

| RI | ($W_{2V}$, $W_{2H}$) | Total number bits for ($W_{2V}$, $W_{2H}$) | Total number bits for ($W_{2V}$, $W_{2H}$) + CQI |
|---|---|---|---|
| 1 | $W_{2V}$: 0, 2 (i$_{2V}$ CW index in Table 8) $W_{2H}$: 0, 2, 4, 6, 8, 10, 12, 14 (i$_{2H}$ CW index in Table 8) | 4 bits | 8 bits |
| 2 | Option 1: $W_{2V}$: 0, 2 (i$_{2V}$ CW index in Table 11) $W_{2H}$: 0-7 (i$_{2H}$ CW index in Table 11) Option 2: $W_{2V}$: 0, 2, 4, 6 (i$_{2V}$ CW in Table 13) $W_{2H}$: 0-3 (i$_{2H}$ CW in Table 13) | 4 bits | 11 bits |

1) PUCCH Mode 1-1 Submode 1 Design 2 for FIG. 1B:

FIG. 12 illustrates PUCCH feedback over multiple subframes according to some embodiments of the present disclosure, when the UE is configured with PUCCH mode 1-1 submode 1. FIG. 12 PUCCH mode 1-1 submode 1 for FIG. 1B. In this design, WB $W_{2V}$+CQI and WB $W_{2H}$+CQI reports alternate in time in WB CQI/PMI reporting instances. Although feedback frequency of $W_{2V}$ and $W_{2H}$ is effectively reduced in this design, subsampling is not necessary, which ensures better decoding reliability at the receiver side.

A design for WB $W_{2V}$+CQI and WB $W_{2H}$+CQI can be respectively found in TABLE 27 and TABLE 28.

TABLE 27

WB $W_{2V}$ + CQI

| RI | $W_{2V}$ + CQI | Total number bits for $W_{2V}$ | Total number bits for $W_{2V}$ + CQI |
|---|---|---|---|
| 1 | $W_{2V}$: 0-3 ($i_{2V}$ CW index in Table 8) | 2 bits | 6 bits |
| 2 | Option 1: | 2 bits | 9 bits |
|   | $W_{2V}$: 0-3 ($i_{2V}$ CW index in Table 11) |  |  |
|   | Option 2: | 3 bits | 10 bits |
|   | $W_{2V}$: 0-7 ($i_{2V}$ CW in Table 13) |  |  |

TABLE 28

WB $W_{2H}$ + WB CQI

| RI | $W_{2H}$ + CQI | Total number bits for $W_{2H}$ | Total number bits for $W_{2H}$ + CQI |
|---|---|---|---|
| 1 | $W_{2H}$: 0-15 ($i_{2H}$ CW index in Table 8) | 4 bits | 6 bits |
| 2 | Option 1: | 3 bits | 10 bits |
|   | $W_{2H}$: 0, 2, 4, 6, 8, 10, 12, 14 ($i_{2H}$ CW index in Table 11) |  |  |
|   | Option 2: |  |  |
|   | $W_{2H}$: 0-7 ($i_{2H}$ CW in Table 13) |  |  |

PUCCH Mode 1-1 Submode 2

In PUCCH mode 1-1 submode 2, only RI is transmitted in RI reporting instances.

FIG. 13 illustrates PUCCH feedback over multiple subframes according to some embodiments of the present disclosure, when the UE is configured with PUCCH mode 1-1 submode 2, wherein WB ($W_{1V}$, $W_{2V}$)+CQI and WB ($W_{1H}$, $W_{2H}$)+CQI alternate in time in WB PMI/CQI reporting instances. FIG. 13 illustrates PUCCH mode 1-1 Submode 2 Design 1 for FIG. 1B.

TABLE 29 and TABLE 30 respectively illustrate methods to encode ($W_{1V}$, $W_{2V}$)+WB CQI and ($W_{1H}$, $W_{2H}$)+WB CQI according to some embodiments of the present disclosure. In particular, in TABLE 29, subsampled indices in the rank-2 case are 0, 2, 4, and 6, which correspond to four vertical beam selection indices and a single co-phasing factor. In TABLE 29, for the case of rank-2 option 1 case, the $W_{2H}$ indices are subsampled in a way that all the horizontal beams and a single co-phasing factor are selected.

TABLE 29

($W_{1V}$, $W_{2V}$) + WB CQI

| RI | ($W_{1V}$, $W_{2V}$) | Total number bits for ($W_{1V}$, $W_{2V}$) | Total number bits for ($W_{1V}$, $W_{2V}$) + CQI |
|---|---|---|---|
| 1 | $W_{1V}$: 0, 4, 8, 12 (1$^{st}$ PMI $i_1$ in Table 3) $W_{2V}$: 0-3 (CW index in Table 8) | 4 bits | 8 bits |
| 2 | Option 1: $W_{1V}$: 0, 4, 8, 12 (1$^{st}$ PMI $i_1$ in Table 4) $W_{2V}$: 0-3 (CW index in Table 11) Option 2: $W_{1V}$: 0, 4, 8, 12 (1$^{st}$ PMI $i_1$ in Table 4) $W_{2V}$: 0, 2, 4, 6 (CW in Table 13) | 4 bits | 11 bits |

TABLE 30

($W_{1H}$, $W_{2H}$) + WB CQI

| RI | ($W_{1H}$, $W_{2H}$) | Total number bits for ($W_{1H}$, $W_{2H}$) | Total number bits for ($W_{1H}$, $W_{2H}$) + CQI |
|---|---|---|---|
| 1 | $W_{1H}$: 0, 8 (1$^{st}$ PMI $i_1$ in Table 3) $W_{2H}$: 0, 2, 4, 6, 8, 10, 12, 14 ($i_{2H}$ index in Table 8) | 4 bits | 8 bits |
| 2 | Option 1: $W_{1H}$: 0, 8 (1$^{st}$ PMI $i_1$ in Table 4) $W_{2H}$: 0, 2, 4, 6, 8, 10, 12, 14 ($i_{2H}$ index in Table 11) Option 2: $W_{1H}$: 0, 4, 8, 12 (1$^{st}$ PMI $i_1$ in Table 4) $W_{2H}$: 0-3 ($i_{2H}$ index in Table 13) | 4 bits | 11 bits |

FIG. 14 illustrates PUCCH feedback over multiple subframes according to some embodiments of the current invention, wherein WB ($W_{2V}$, $W_{2V}$)+CQI and WB ($W_{1V}$, $W_{1H}$)+CQI are transmitted in PMI/CQI reporting instances. FIG. 14 illustrates PUCCH mode 1-1 Submode 2.

TABLE 31 and TABLE 32 respectively illustrate methods to encode WB ($W_{1V}$, $W_{1H}$)+CQI and WB ($W_{2V}$, $W_{2H}$)+CQI. This design aims to improve the reliability of the second H-PMI and V-PMI. Since as the second H-PMI and V-PMI are used to capture the short term and frequency selective properties of the channels, the feedback frequency may have large impact on the feedback accuracy. In this design shown in FIG. 14, jointly encoded WB ($W_{2V}$, $W_{2H}$) and WB CQI, are fed back more frequently than the jointly encoded WB ($W_{1V}$, $W_{1H}$) and WB CQI.

TABLE 31

WB ($W_{1V}$, $W_{1H}$) + CQI

| RI | ($W_{1V}$, $W_{1H}$) | Total number bits for ($W_{1V}$, $W_{1H}$) | Total number bits for ($W_{1V}$, $W_{1H}$) + CQI |
|---|---|---|---|
| 1 | $W_{1V}$: 0, 4, 8, 12 (1$^{st}$ PMI $i_1$ in Table 3) $W_{1H}$: 0, 4, 8, 12 (1$^{st}$ PMI $i_1$ in Table 3) | 4 bits | 8 bits |
| 2 | $W_{1V}$: 0, 4, 8, 12 (1$^{st}$ PMI $i_1$ in Table 4) $W_{1H}$: 0, 4, 8, 12 (1$^{st}$ PMI $i_1$ in Table 4) | 4 bits | 11 bits |

TABLE 32

| RI | Subsampling for ($W_{2V}$, $W_{2H}$) | Total number bits for ($W_{2V}$, $W_{2H}$) | Total number bits for ($W_{2V}$, $W_{2H}$) + CQI |
|---|---|---|---|
| | WB ($W_{2V}$, $W_{2H}$) + CQI | | |
| 1 | $W_{2V}$: 0, 2 ($i_{2V}$ index in Table 8)<br>$W_{2H}$: 0, 2, 4, 6, 8, 10, 12, 14 ($i_{2H}$ index in Table 8) | 4 bits | 8 bits |
| 2 | Option 1:<br>$W_{2V}$: 0, 2 ($i_{2V}$ index in Table 11)<br>$W_{2H}$: 0, 2, 4, 6, 8, 10, 12, 14 ($i_{2H}$ index in Table 11)<br>Option 2:<br>$W_{2V}$: 0, 4, ($i_{2V}$ index in Table 13)<br>$W_{2H}$: 0-7 ($i_{2H}$ index in Table 13) | 4 bits | 11 bits |

PUCCH Mode 2-1

Figure 15:
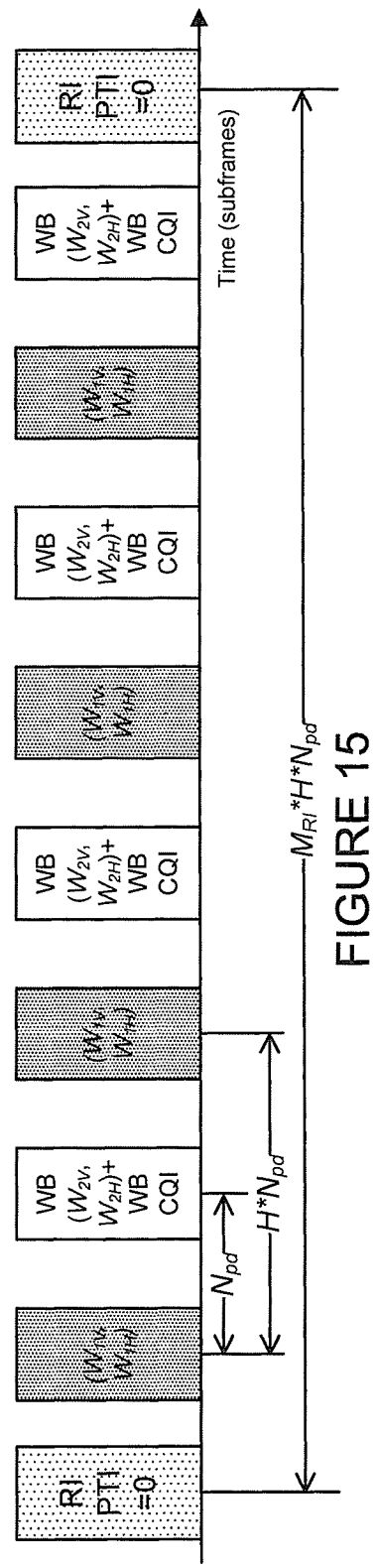
FIG. 15 illustrates PUCCH feedback over multiple subframes according to some embodiments of the present disclosure.

In PUCCH mode 2-1, RI and PTI are transmitted in the RI reporting instances. The PUCCH reporting when PTI=0 is illustrated in FIG. 15. FIG. 15 illustrates PUCCH mode 2-1 design 1 for FIG. 1B with PTI=0. ($W_{1V}$, $W_{1H}$) is reported in those subframes for $W_{1H}$ reporting. WB ($W_{2V}$, $W_{2H}$)+CQI are reported in those subframes for WB ($W_{2V}$, $W_{2H}$)+CQI reporting.

The present disclosure addresses an inevitable issue for FD-MIMO standardization (periodic CSI feedback and codebook subsampling): the PUCCH can carry up to only 11 bits, and periodic CSI feedback contents in each subframe should be less than or equal to 11 bits. In addition, it is also desirable to keep the number of bits as small as possible to improve the reception reliability at the BS. For example, the decoding reliability of 3 bit information is better than 5 bit information because the coding rate of the Reed-Muller (RM) code gets decreased. An increased number of bits to feedback CSI for FD-MIMO is likely, and presents a challenge of how to multiplex CSI to fit in (or to reliably transmit) that information on PUCCH. This disclosure addresses that challenge of reliable transmission of periodic CSI feedback.

Comprehensive coverage on PUCCH feedback signaling is a second aspect of the present disclosure. The may be many alternatives for the exact method for PUCCH feedback signaling A comprehensive set of such methods has been illustrated herein by description of the most promising for PUCCH feedback signaling, especially for PUCCH mode 1-1 and 2-1. The alternatives described include options for constructing PUCCH mode 1-1 submode 1 (i.e., RI+$W_{1H}$ reporting in RI reporting instances and $W_{2H}W_{2V}$+CQI reporting in CQI/PMI reporting instances; RI+$W_{1H}$ reporting in RI reporting instances and $W_{2H}$+$W_{2V}$+CQI and $W_{2H}$+CQI time multiplexed in CQI/PMI reporting instances; and RI+$W_{1H}$ reporting in RI reporting instances and $W_{2H}$+CQI reporting in CQI/PMI reporting instances). Options for construction of PUCCH mode 1-1 submode 2 and mode 2-1 are also described, together with subsampling methods for these PUCCH modes. This disclosure also exploits advantages of a single CSI process feedback over a multiple CSI process feedback, specifically: a wider range of UEs can support FD-MIMO CSI feedback (UE capacity); and coordinated multipoint (CoMP) extension is straightforward (a multiple CSI process can be implemented only for CoMP).

The overall codebook structure employed in the present disclosure is a Kronecker Product: $W = W_V \otimes W_H$, where $W_V$ is a vertical codebook and $W_H$ is a horizontal codebook. The vertical codebook $W_V$ is a 2-Tx codebook, a special form of the double codebook structure based upon $W_{1V}$, the identity matrix (which need not be fed back) and $W_{2V}$, a Release-8 2-Tx codebook. The horizontal codebook $W_H$ is a Release-10 8-Tx codebook, also a double codebook structure $W_H = W_{1H} W_{2H}$, where $W_{1H}$ is a block diagonal matrix and $W_{2H}$ is chosen for beam selection and co-phasing.

For a rank-1 codebook, a rank-1 codeword W is constructed such that both $W_V$ and $W_H$ are a rank-1 precoding vector, e.g., $W_V$ may be a 2×1 precoding vector and $W_H$ may be a 8×1 precoding vector so that W is a 16×1 precoding vector. For a rank-2 codebook, in one set a rank-2 codeword W is constructed by rank-1 $W_V$ and rank-2 $W_H$, e.g., $W_V$ may be a 2×1 precoding vector (2-Tx rank-1 codeword) and $W_H$ may be a 8×2 precoding matrix (8-Tx rank-2 codeword) such that W is a 16×2 precoding matrix. In an alternative set for a rank-2 codebook, a rank-2 codeword W is constructed by a rank-2 $W_V$ and a rank-1 $W_H$, e.g., $W_V$ may be a 2×2 precoding matrix (2-Tx rank-2 codeword) and $W_H$ may be a 8×1 precoding vector (8-Tx rank-1 codeword) such that W is a 16×2 precoding matrix.

For PUCCH mode 1-1 submode 1, a first alternative for submode 1 employs subframe report timing as illustrated in FIG. 2, and RI and $W_{1H}$ joint encoding in accordance with Release 8 encoding for such parameters is sufficient:

TABLE 33

| Value of joint encoding of RI and the first PMI $I_{RI/PMI1}$ | RI | Codebook index $i_1$ |
|---|---|---|
| 0-7 | 1 | $2I_{RI/PMI1}$ |
| 8-15 | 2 | $2(I_{RI/PMI1} - 8)$ |

$W_{1H}$+RI coding in the RI reporting instances can be kept the same as in Release 8. For $W_{2V}$+$W_{2H}$+CQI, subsampling is necessary to keep the same number of feedback bits as in Release 10.

The first alternative for submode 1 employs rank 1 $W_{2V}$ subsampling for V-PMI (illustrated in FIGS. 16A, 16B and 17), with $W_{2V} \in \{0,1\}$ or $\{0,2\}$:

$$\frac{1}{\sqrt{2}}\begin{bmatrix}1\\-1\end{bmatrix}, \frac{1}{\sqrt{2}}\begin{bmatrix}1\\1\end{bmatrix}, \theta_0 = 90°: \frac{1}{\sqrt{2}}\begin{bmatrix}1\\1\end{bmatrix},$$

$$a(v) = [1, e^{-jv}]^T \text{ with}$$

$$v := \frac{2\pi d_V}{\lambda_c} \cos\theta_0.$$

For example, $a(v)=[1, j]^T$ if $$v = \frac{3\pi}{2};$$

or $\theta_0 = 120°$ with $$\frac{2\pi d_V}{\lambda_c} = \pi.$$

Although [1, j] is more frequently employed, [1, −1] could be a better choice for MU-MIMO. This disclosure describes both subsampling of {[1, 1], [1, j]} and {[1, 1], [1, −1]}, as well as subsampling that is higher-layer configurable between the two.

The first alternative for submode 1 also employs rank 1 $W_{2H}$ subsampling, with $W_{2H} \in \{0,1,\ldots,7\}$:

TABLE 34

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

$$W_{m,n}^{(1)} = \frac{1}{\sqrt{8}} \begin{bmatrix} v_m \\ \varphi_n v_m \end{bmatrix}$$

TABLE 35

Codebook for 1-layer CSI reporting using antenna ports 15 to 22

| | | | | $i_2$ | | | | |
|---|---|---|---|---|---|---|---|---|
| $i_1$ | 0 | 1 | 2 | 3 | 4 | 5 | 6 | 7 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| | | | | $i_2$ | | | | |
|---|---|---|---|---|---|---|---|---|
| $i_1$ | 8 | 9 | 10 | 11 | 12 | 13 | 14 | 15 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$ In the rank-1 case, $W_{2H}$ indices $\{0,1,2,3,4,5,6,7\}$ utilizes first and second beams with all four co-phasing factors $\{1, -1, j, -j\}$, which equates to 32 DFT beams in the horizontal dimension (same as Release 10 codebook).

The first alternative for submode 1 employs, for $W_{2V}+W_{2H}+CQI$, a rank 2 subsampling codebook that comprises two sets: a first rank 2 subsampling set for which $W_{2V} \in \{0, 1\}$, rank-1:

$$\frac{1}{\sqrt{2}} \begin{bmatrix} 1 \\ 1 \end{bmatrix} \quad \frac{1}{\sqrt{2}} \begin{bmatrix} 1 \\ -1 \end{bmatrix},$$

and $W_{2H} \in \{0,1,2,3\}$, rank-2, first and second beams (same beam cases) with both co-phasing factors $\{0, j\}$ corresponding to TABLE 4 with:

$$W_{m,m',n}^{(2)} = \frac{1}{4} \begin{bmatrix} v_m & v_{m'} \\ \varphi_n v_m & -\varphi_n v_{m'} \end{bmatrix},$$

$$\varphi_m = e^{j\pi n/2},$$

$$v_m = [1 \; e^{j2\pi n/32} \; e^{j4\pi n/32} \; e^{j6\pi n/32}]^T;$$

and a second rank 2 subsampling set for which $W_{2V}$ is a fixed rank-2 codeword $$\frac{1}{2} \begin{bmatrix} 1 & 1 \\ 1 & -1 \end{bmatrix}$$

and $W_{2H} \in \{0,1,\ldots,7\}$, rank-1, corresponding to TABLE 35.

A second alternative for PUCCH mode 1-1 submode 1 employs the timing illustrated in FIG. 3, with $W_{2V}+W_{2H}+CQI$ and $W_{2H}+CQI$ time-multiplexed in CQI reporting instances and with $W_{2V}+W_{2H}+CQI$ feedback content constructed according to previous alternative and $W_{2H}$, $W_{2H}+CQI$ satisfying TABLE 11. Because no subsampling is necessary for $W_{2H}+CQI$, in this alternative $W_{2H}$ feedback is more reliable.

A third alternative for PUCCH mode 1-1 submode 1 employs the timing illustrated in FIG. 4, with $W_{2H}+CQI$ reported in CQI reporting instances (same as Release 10) and $RI+W_{2V}+W_{2H}$ jointly reported in RI reporting instances, such that subsampling is necessary. When RI=1, $W_{2V} \in \{0, 1\}$, $W_{1H} \in \{0,2,4,\ldots,14\}$ (same as Release 10 subsampling) using:

$$\frac{1}{\sqrt{2}} \begin{bmatrix} 1 \\ 1 \end{bmatrix} \quad \frac{1}{\sqrt{2}} \begin{bmatrix} 1 \\ -1 \end{bmatrix},$$

When RI=2, the subsampling codebook comprises two sets: a first subsampling set for which $W_{2V} \in \{0,1\}$, rank-1:

$$\frac{1}{\sqrt{2}} \begin{bmatrix} 1 \\ 1 \end{bmatrix} \quad \frac{1}{\sqrt{2}} \begin{bmatrix} 1 \\ -1 \end{bmatrix},$$

and $W_{2H}$ is interpreted as rank-2, $W_{2H} \in \{0,2,4,\ldots,14\}$ (same as Release 10 subsampling); and a second subsampling set for which $W_{2V}$ is a fixed rank-2 codeword:

$$\frac{1}{2}\begin{bmatrix} 1 & 1 \\ 1 & -1 \end{bmatrix}$$

And $W_{2H}$ is interpreted as rank-1, $W_{2H} \in \{0,4,8,12\}$ (which is 2× coarser sampling than Release 10). $W_{2H}$ interpretation is thus dependent upon decoded value of RI and $W_{2V}$. This alternative results in less aggressive subsampling for $W_{2H}$, but also results in a need for $W_{2V}$ to additionally be carried on RI reporting instances.

For PUCCH mode 1-1 submode 2, in one embodiment RI is separately fed back in RI reporting instances, which requires that $W_{1H}$, $W_{2H}$, and $W_{2V}$ be sent in CQI reporting instances. One option is time multiplexing of ($W_{1H}$, $W_{2V}$, CQI) and ($W_{1H}$, $W_{2H}$, CQI) (see FIG. 5); another option is time multiplexing of ($W_{1H}$, $W_{2V}$, CQI) and ($W_{2H}$, CQI) (see FIG. 6). Subsampling is necessary for some of these PMI/CQI feedback methods, and the subsampling methods described above for alterative 1 can be employed. By way of comparison, in Release 10 PUCCH mode 1-1 submode 2 RI is separately fed back and WB ($W_1$, $W_2$)+WB CQI are reported in CQI reporting instances.

For PUCCH mode 2-1, in one embodiment when the most recently reported PTI=0, $W_{1H}$ and ($W_{2V}$, $W_{2H}$, CQI) are time multiplexed in CQI/PMI reporting instances (see FIG. 7). When the most recently reported PTI=1, WB ($W_{2V}$, $W_{2H}$, CQI) and SB ($W_{2V}$, $W_{2H}$, CQI) are time multiplexed in CQI/PMI reporting instances (see FIGS. 8A and 8B).

The present disclosure also addresses an important issue for FD-MIMO standardization: feedback overhead and complexity reduction for double-codebook based FD-MIMO feedback coding. A major issue with FD-MIMO CSI feedback would be the complexity and overhead for CQI feedback, as the codebook size is almost certain to increase for FD-MIMO. This disclosure suggests a promising method to reduce the codebook size for FD-MIMO codebook without losing any performance, and also suggests two different ways of constructing rank-2 codebook, with partitioning information on co-phasing and two beams into H and V second PMI.

Cross-polarized (x-pol) is the most important antenna configuration to be considered in FD-MIMO and x-pol has been almost exclusive studied during the standardization. The benefits of x-pol against widely spaced antennas are in terms of BS antenna panel form factor and performance; with x-pol it has been observed in SLS that rank-2 is quite easily achieved which could improve throughput by 2×; on the other hand widely spaced co-pot may suffer from interference due to grating lobes.

Straightforward design of Kronecker product codebook incurs huge UE complexity, so standardization should provide complexity reduction of the type disclosed in this disclosure. Codebook subset restriction could be sufficient for the FD-MIMO codebook design. Optimal designs may depend upon whether FD-MIMO will support up to 8 or 16 antenna ports, or up to 64 ports.

For cross-polarized (x-pol) antenna arrays or sub-arrays, co-phasing in both H and V codebooks is unnecessary. By getting rid of co-phasing from either H or V, 2 bits can be saved without losing performance, a 4X complexity savings resulting in 16384 codewords. The rank-2 codebook construction may employ one beam for V, two beams and co-phasing for H, or one beam and co-phasing for V, two beams for H. PUCCH codebook subsampling reduces complexity and overhead.

The FD-MIMO double codebook structure proposed in this disclosure include vertical and horizontal codebooks defined as:

$$W_{1V} = \left\{ \begin{bmatrix} X_V(i_V) & 0 \\ 0 & X_V(i_{1V}) \end{bmatrix}, i_{1V} = 0, 1, \ldots, 15 \right\},$$

$$W_{1H} = \left\{ \begin{bmatrix} X_H(i_H) & 0 \\ 0 & X_H(i_{1H}) \end{bmatrix}, i_{1H} = 0, 1, \ldots, 15 \right\},$$

where $W_{1V}$ and $W_{1H}$ are selected to be a 4×4 matrix X(i) defined as in the following:

$$X(i) := [v_{2i \bmod 32} \ v_{(2i+1) \bmod 32} \ v_{(2i+2) \bmod 32} \ v_{(2i+3) \bmod 32}]$$

with $v_n = [1 \ e^{j2\pi n/32} \ e^{j2\pi 2n/32} \ e^{j2\pi 3n/32}]^T$ and with $i=0,1,\ldots,15$. In the first codebooks $W_1$ (size 32×32), $i_{1V}$ and $i_{1H}$ determines a set of beams:

$$W_1 = \left\{ \begin{bmatrix} X_V(i_{1V}) \cdot X_H(i_{1H}) & 0 \\ 0 & X_V(i_{1V}) \cdot X_H(i_{1H}) \end{bmatrix} \right\},$$

$$i_{1V} \cdot i_{1H} = [v_{2i_{1V} \bmod 23} \otimes v_{2i_{1H} \bmod 32}$$

$$v_{2i_{1V} \bmod 32} \otimes v_{(2i_{1H}+1) \bmod 32} \cdots v_{(2i_{1V}+3) \bmod 32} \otimes v_{(2i_{1H}+3) \bmod 32}].$$

In the first codebooks $W_2$, $i_{2V}$ and $i_{2H}$ give beam selection and co-phasing.

In constructing the FD-MIMO double codebook, for each polarization, a Kronecker product is applied or H and V beams ($v_m$ and 84 $_{m'}$) to construct a 16×1 vector. Co-phasing on the two Kronecker product beams of the two polarizations is applied to construct a rank-1 precoder. The one to one mapping between antenna port and cross-polarized antenna elements is illustrated in FIG. 18. Note that if (4+4) and (4+4) bits are used for H and V domain, total number of bits for the codebook is 16 bits, which is too many to fit in a single PUCCH format 2, and likely can be further optimized in terms of feedback overhead.

For one design of an overhead efficient rank-1 codebook construction, a beamforming vector corresponding to index pair (m, m') and co-phasing n is formed as $$w_{m,m',n} = \frac{1}{\sqrt{32}} \begin{bmatrix} v_m \otimes v_{m'} \\ \varphi_n v_m \otimes v_{m'} \end{bmatrix},$$

where $\phi_n = e^{jn\pi/2}$, n=0,1,2,3 and where m is a function of $i_{1V}$ and $i_{2V}$ and (m', n) is a function of $i_{1H}$ and $i_{2H}$:

TABLE 36

| $W_{2H}$ | | | |
|---|---|---|---|
| 0 | 1 | 2 | 3 |
| $w_{2i_{1V}+i_{2V},2i_{1H},0}$ | $w_{2i_{1V}+i_{2V},2i_{1H},1}$ | $w_{2i_{1V}+i_{2V},2i_{1H},2}$ | $w_{2i_{1V}+i_{2V},2i_{1H},3}$ |
| 4 | 5 | 6 | 7 |
| $w_{2i_{1V}+i_{2V},2i_{1H}+1,0}$ | $w_{2i_{1V}+i_{2V},2i_{1H}+1,1}$ | $w_{2i_{1V}+i_{2V},2i_{1H}+1,2}$ | $w_{2i_{1V}+i_{2V},2i_{1H}+1,3}$ |

TABLE 36-continued

| 8 | 9 | 10 | 11 |
|---|---|---|---|
| $w_{2i_{1V}+i_{2V},2i_{1H}+2,0}$ | $w_{2i_{1V}+i_{2V},2i_{1H}+2,1}$ | $w_{2i_{1V}+i_{2V},2i_{1H}+2,2}$ | $w_{2i_{1V}+i_{2V},2i_{1H}+2,3}$ |
| 12 | 13 | 14 | 15 |
| $w_{2i_{1V}+i_{2V},2i_{1H}+3,0}$ | $w_{2i_{1V}+i_{2V},2i_{1H}+3,1}$ | $w_{2i_{1V}+i_{2V},2i_{1H}+3,2}$ | $w_{2i_{1V}+i_{2V},2i_{1H}+3,3}$ |

$$w_{m,m',n} = \frac{1}{\sqrt{32}}\begin{bmatrix} v_m \otimes v_{m'} \\ \varphi_n v_m \otimes v_{m'} \end{bmatrix}$$

In TABLE 36, $m = 2i_{1V} + i_{2V}$, $i_{2V} \in \{0,1,2,3\}$, $m' = 2i_{1H} + \lfloor i_{2H}/4 \rfloor$, $n = i_{2H}$ mod 4, and $i_{2H} \in \{0,1,\ldots,15\}$. Co-phasing need not be applied to both H and V domains. By eliminating co-phasing from the V domain, resulting in (4+2) bits for the V domain while (4+4) bits are employed for the H domain, a 2 bit savings is achieved without losing performance.

For one option for a rank-2 codebook, a beamforming vector corresponding to index (m, m', m") and co-phasing n is formed as $$W^{(2)}_{m,m',m'',n} = \frac{1}{8}\begin{bmatrix} v_m \otimes v_{m'} & v_m \otimes v_{m''} \\ \varphi_n v_m \otimes v_{m'} & -\varphi_n v_m \otimes v_{m''} \end{bmatrix},$$

where m is a function of $i_{1V}$ and $i_{2V}$ (same as the rank-1 design just described) and (m', m", n) is a function of $i_{1H}$ and $i_{2H}$ (that is, the horizontal codebook may be the same at Release 10 8 Tx):

TABLE 37

| $W_{2H}$ | | | |
|---|---|---|---|
| 0 | 1 | 2 | 3 |
| $w_{2i_{1V}+i_{2V},2i_{1H},2i_{1H},0}$ | $w_{2i_{1V}+i_{2V},2i_{1H},2i_{1H},1}$ | $w_{2i_{1V}+i_{2V},2i_{1H}+1,2i_{1H},0}$ | $w_{2i_{1V}+i_{2V},2i_{1H}+1,2i_{1H}+1,1}$ |
| 4 | 5 | 6 | 7 |
| $w_{2i_{1V}+i_{2V},2i_{1H}+2,2i_{1H},0}$ | $w_{2i_{1V}+i_{2V},2i_{1H}+2,2i_{1H},1}$ | $w_{2i_{1V}+i_{2V},2i_{1H}+3,2i_{1H},0}$ | $w_{2i_{1V}+i_{2V},2i_{1H}+3,2i_{1H}+3,1}$ |
| 8 | 9 | 10 | 11 |
| $w_{2i_{1V}+i_{2V},2i_{1H},2i_{1H}+1,0}$ | $w_{2i_{1V}+i_{2V},2i_{1H},2i_{1H}+1,1}$ | $w_{2i_{1V}+i_{2V},2i_{1H}+1,2i_{1H}+2,0}$ | $w_{2i_{1V}+i_{2V},2i_{1H}+1,2i_{1H}+2,1}$ |
| 12 | 13 | 14 | 15 |
| $w_{2i_{1V}+i_{2V},2i_{1H},2i_{1H}+3,0}$ | $w_{2i_{1V}+i_{2V},2i_{2H},2i_{2H}+3,1}$ | $w_{2i_{1V}+i_{2V},2i_{2H}+1,2i_{2H}+3,0}$ | $w_{2i_{1V}+i_{2V},2i_{2H}+1,2i_{2H}+3,1}$ |

$$w_{m,m',m'',n} = \frac{1}{8}\begin{bmatrix} v_m \otimes v_{m'} & v_m \otimes v_{m''} \\ \varphi_n v_m \otimes v_{m'} & -\varphi_n v_m \otimes v_{m''} \end{bmatrix}$$

In TABLE 37, $m = 2i_{1V} + i_{2V}$, $i_{2V} \in \{0,1,2,3\}$, $m' = 2i_{1H} + f_1(i_{2H})$, $m'' = 2i_{1H} + f_2(i_{2H})$, $(i_{2H})$, $n = i_{2H}$ mod 2, and $i_{2H} \in \{0,1,\ldots,15\}$.

For a second option for a rank-2 codebook, a beamforming vector corresponding to index (m, m', m") and co-phasing n is formed as $$W^{(2)}_{m,m',m'',n} = \frac{1}{8}\begin{bmatrix} v_m \otimes v_{m'} & v_m \otimes v_{m''} \\ \varphi_n v_m \otimes v_{m'} & -\varphi_n v_m \otimes v_{m''} \end{bmatrix}, \varphi_n = e^{jn\pi}, n = 0, 1,$$

where (m, n) is a function of $i_{1V}$ and $i_{2V}$, (m', m") is a function of $i_{1H}$ and $i_{2H}$:

TABLE 38

| $W_{2V}$ indices | (m, n) | $W_{2V}$ indices | (m', m") |
|---|---|---|---|
| 0 | (0, 0) | 0 | (0, 0) |
| 1 | (0, 1) | 1 | (1, 1) |
| 2 | (1, 0) | 2 | (2, 2) |
| 3 | (1, 1) | 3 | (3, 3) |
| 4 | (2, 0) | 4 | (0, 1) |
| 5 | (2, 1) | 5 | (1, 2) |
| 6 | (3, 0) | 6 | (0, 3) |
| 7 | (3, 1) | 7 | (3, 0) |

In TABLE 38, $m = 2i_{1V} + \lfloor i_{2V}/2 \rfloor$, $i_{2V} \in \{0,\ldots,7\}$, $n = i_{2V}$ mod 2, $m' = 2i_{1H} + f_1(i_{2H})$, $m'' = 2i_{1H} + f_2(i_{2H})$, and $i_{2H} \in \{0,\ldots,7\}$. In this design, information is balanced between H and V feedback, which is beneficial for PUCCH.

In PUCCH feedback for one alternative for PUCCH Mode 1-1, submode 1, RI, $W_{1H}$ and $W_{1V}$ are jointly encoded and fed back in RI reporting instances (see FIG. 11), while $W_{2V}$, $W_{2H}$ and CQI are fed back in CQI/PMI reporting instances. In the RI+$W_{1H}$+$W_{1V}$ joint encoding, beams are uniformly subsampled (see TABLE 24). The $W_{2V}$+$W_{2H}$+CQI reporting, for rank 1, employs uniform beam subsampling (1 bit) for $W_{2V}$ and uniform co-phase subsampling (3 bits) for $W_{2H}$ (see TABLE 17, values m=0 for $i_{2V}$=0 and m=2 for $i_{2V}$=2 and values {0,0} for {m', n} when $i_{2H}$=0, {0,2} when $i_{2H}$=2, {1,0} when $i_{2H}$=4, {1,2} when $i_{2H}$=6, {2,0} when $i_{2H}$=8, {2,2} when $i_{2H}$=10, {3,0} when $i_{2H}$=12, and {3,2} when $i_{2H}$=14). One option for the $W_{2V}$+$W_{2H}$+CQI reporting, for rank 2, employs uniform beam subsampling (1 bit) for $W_{2V}$ and all combinations of same-beam pairs (3 bits) for $W_{2H}$ (see TABLE 20, values m=0 for $i_{2V}$=0 and m=2 for $i_{2V}$=2 and the first two rows for $i_{2H}$ indices). An alternate option for the $W_{2V}$+$W_{2H}$+CQI reporting, for rank 2, employs uniform beam subsampling (2 bits) for $W_{2V}$ and all combinations of same-beam pairs (2 bits) for $W_{2H}$ (see TABLE 22, values (m, n)=(0,0) for $i_{2V}$=0, (m, n)=(0,1) for $i_{2V}$=1, (m,)=(1,0) for $i_{2V}$=2, (m, n)=(2,0) for $1_{2V}$=4, and (m, n)=(2,1) for $i_{2V}$=5, and the first three rows for $i_{2H}$ indices).

In PUCCH feedback for another alternative for PUCCH Mode 1-1, submode 1, (RI, $W_{1H}$ and $W_{1V}$) are jointly encoded and fed back in RI reporting instances (see FIG. 12), while ($W_{2V}$, CQI) and ($W_{2H}$, CQI) are time multiplexed in CQI/PMI reporting instances. For one option, TABLE 20 is employed. For a second option, no subsampling is necessary for $W_{2V}$, $W_{2H}$ reporting (see TABLE 22).

In PUCCH feedback for PUCCH Mode 1-1, submode 2, only RI is reported in RI reporting instances (see FIG. 12), while ($W_{1V}$, $W_{2V}$, CQI) and ($W_{1H}$, $W_{2H}$, CQI) are time multiplexed in CQI/PMI reporting instances. For ($W_{1V}$, $W_{2V}$, CQI) reporting, if RI=1, uniformly subsampled beam indices {0,4,8,12} are employed for $W_{1V}$ and no subsampling is necessary ($i_{2V}$ {0,1,2,3}) for $W_{2V}$. If RI=2, uniformly subsampled beam indices {0,4,8,12} are employed for $W_{1V}$ and either no subsampling is necessary ($i_{2V}$ {0,1,2,3}) or all combinations of same-beam pairs ($i_{2V}$={0,1,4,5}, (m, n)= (0,0), (0,1), (2,0), (2,1)) are employed for $W_{2V}$. For ($W_{1V}$, $W_{2V}$, CQI) reporting, if RI=1, uniformly subsampled beam indices {0,8} are employed for $W_{1H}$ and indices $i_{2V}$={0,2,4, . . . , 14} are employed for $W_{2H}$ (see corresponding $i_{2H}$ entries in TABLE 17). If RI=2, uniformly subsampled beam indices {0,8} are employed for $W_{1H}$ and either indices $i_{2H}$={0, . . . , 7} or all combinations of same-beam pairs ($i_{2H}$={0,1,2,3}) are employed for $W_{2H}$ (see corresponding $i_{2H}$ values in TABLE 20 and TABLE 22, respectively).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment, comprising:
a transceiver configured to communicate with at least one base station; and
processing circuitry configured to control the transceiver to:
receive a set of channel state information reference signals (CSI-RS);
estimate channels based on the received CSI-RS;
derive a channel quality indicator (CQI) based on the channel estimates and a precoding matrix; and
report the CQI and at least a first and a second precoding matrix indicator (PMI) $i_{2V}$ and $i_{2H}$,
wherein at least a first index m, a second index m', and a third index n are determined based upon the first and the second PMI $i_{2V}$ and $i_{2H}$ and a third and a fourth PMI $i_{1V}$ and $i_{1H}$,
wherein the indices m, m' and n are employed to select the precoding matrix,
wherein the selected precoding matrix includes a first column comprising a first row partition and a second row partition,
wherein the first row partition is a Kronecker product of at least first and second precoding vectors $v_m$ and $v_{m'}$ and the second row partition is a Kronecker product of a first term and a second term, wherein the first term is a product of a co-phasing factor $\phi_n$ and the first precoding vector $v_m$ and the second term is the second precoding vector $v_{m'}$, and
wherein the first precoding vector $v_m$ is selected from a first codebook and the second precoding vector $v_{m'}$ is selected from a second codebook.

2. The user equipment according to claim 1, wherein the report of the CQI and the PMI is made on a PUCCH and wherein a report prior to the report on the PUCCH includes the third and the fourth PMI $i_{1V}$ and $i_{1H}$.

3. The user equipment according to claim 2, wherein subsampling of the second PMI $i_{2H}$ selects even-numbered entries.

4. The user equipment according to claim 2, wherein subsampling of the second PMI $i_{2H}$ selects the first half of entries within a set of entries for the second PMI $i_{2H}$.

5. The user equipment according to claim 1, wherein the report of the CQI and the PMI is made on a PUSCH, wherein the report of the CQI and the PMI on the PUSCH is for subband and a report of the third and the fourth PMI $i_{1V}$ and $i_{1H}$ on the PUSCH is for wideband.

6. The user equipment according to claim 1, wherein the precoding matrix indicators relate to a rank-1 precoding matrix $w_{m,m',n}$ constructed by $$w_{m,m',n} = q \begin{bmatrix} v_m \otimes v_{m'} \\ \varphi_n v_m \otimes v_{m'} \end{bmatrix},$$

where q is a normalizing factor.

7. The user equipment according to claim 1, wherein the first codebook, from which the precoding vector $v_m$ is selected, is a Discrete Fourier Transform (DFT) codebook having size $N_1$ that is oversampled with an oversampling factor $o_1$ and wherein the second codebook, from which the precoding vector $v_{m'}$ is selected, is a DFT codebook having size $N_2$ that is oversampled with an oversampling factor $o_2$.

8. The user equipment according to claim 1, wherein the precoding matrix indicators relate to a rank-2 precoding matrix $W_{m,m',m'',n}^{(2)}$ constructed by $$W_{m,m',m'',n}^{(2)} = q \begin{bmatrix} v_m \otimes v_{m'} & v_m \otimes v_{m''} \\ \varphi_n v_m \otimes v_{m'} & -\varphi_n v_m \otimes v_{m''} \end{bmatrix},$$

where m" is a fourth index employed with the indices m, m' and n to select the rank-2 precoding matrix, $v_{m''}$ is a third precoding vector selected from the second codebook, and q is a normalizing factor.

9. The user equipment according to claim 1, wherein the first index m is a function of the first PMI $i_{2V}$ the third PMI $i_{1V}$, the second index m' is a function of the second PMI $i_{2H}$ and the fourth PMI $i_{1H}$, and the third index n is a function of the second PMI $i_{2H}$.

10. A base station, comprising:
a transceiver configured to communicate with at least one user equipment; and
processing circuitry configured to control the transceiver to:
transmit a set of channel state information reference signals (CSI-RS); and
receive a report of a channel quality indicator (CQI) and at least a first and a second precoding matrix indicator (PMI) $i_{2V}$ and $i_{2H}$, the CQI derived based on channel estimates and a precoding matrix and the channel estimates estimated based on the CSI-RS,
wherein at least a first index m, a second index m', and a third index n are determined based upon the first and the second PMI $i_{2V}$ and $i_{2H}$ and a third and a fourth PMI $i_{1V}$ and $i_{1H}$,
wherein the indices m, m' and n are employed to select the precoding matrix,
wherein the selected precoding matrix includes a first column comprising a first row partition and a second row partition,
wherein the first row partition is a Kronecker product of at least first and second precoding vectors $v_m$ and $v_{m'}$ and the second row partition is a Kronecker product of a first term and a second term, wherein the first term is a product of a co-phasing factor $\phi_n$ and the first precoding vector $v_m$ and the second term is the second precoding vector $v_{m'}$, and wherein the first precoding vector $v_m$ is selected from a first codebook and the second precoding vector $v_{m'}$ is selected from a second codebook.

11. The base station according to claim 10, wherein the report of the CQI and the PMI is made on a PUCCH and wherein a report prior to the report on the PUCCH includes the third and the fourth PMI $i_{1V}$ and $i_{1H}$.

12. The base station according to claim 11, wherein subsampling of the second PMI $i_{2H}$ selects even-numbered entries.

13. The base station according to claim 10, wherein subsampling of the second PMI $i_{2H}$ selects the first half of entries within a set of entries for the second PMI $i_{2H}$.

14. The base station according to claim 10, wherein the report of the CQI and the PMI is made on a PUSCH, wherein the report of the CQI and the PMI on the PUSCH is for subband and a report of the third and the fourth PMI $i_{1V}$ and $i_{1H}$ on the PUSCH is for wideband.

15. The base station according to claim 10, wherein the precoding matrix indicators relate to a rank-1 precoding matrix $w_{m,m',n}$ constructed by $$w_{m,m',n} = q \begin{bmatrix} v_m \otimes v_{m'} \\ \varphi_n v_m \otimes v_{m'} \end{bmatrix},$$

where q is a normalizing factor.

16. The base station according to claim 10, wherein the first codebook, from which the precoding vector $v_m$ is selected, is a Discrete Fourier Transform (DFT) codebook having size $N_1$ that is oversampled with an oversampling factor $o_1$ and wherein the second codebook, from which the precoding vector $v_{m'}$ is selected, is a DFT codebook having size $N_2$ that is oversampled with an oversampling factor $o_2$.

17. The base station according to claim 10, wherein the precoding matrix indicators relate to a rank-2 precoding matrix $W_{m,m',m'',n}^{(2)}$ constructed by $$W_{m,m',m'',n}^{(2)} = q \begin{bmatrix} v_m \otimes v_{m'} & v_m \otimes v_{m''} \\ \varphi_n v_m \otimes v_{m'} & -\varphi_n v_m \otimes v_{m''} \end{bmatrix},$$

where m" is a fourth index employed with the indices m, m' and n to select the rank-2 precoding matrix, $v_{m''}$ is a third precoding vector selected from the second codebook, and q is a normalizing factor.

18. The base station according to claim 10, wherein the first index m is a function of the first PMI $i_{2V}$ the third PMI $i_{1V}$, the second index m' is a function of the second PMI $i_{2H}$ and the fourth PMI $i_{1H}$, and the third index n is a function of the second PMI $i_{2H}$.

19. A method, comprising:

transmitting, from a base station, a set of channel state information reference signals (CSI-RS); and receiving, at the base station, a report from a user equipment of a channel quality indicator (CQI) and at least a first and a second precoding matrix indicator (PMI) $i_{2V}$ and $i_{2H}$, the CQI derived based on channel estimates and a precoding matrix and the channel estimates estimated based on the CSI-RS, wherein at least a first index m, a second index m', and a third index n are determined based upon the first and the second PMI $i_{2V}$ and $i_{2H}$ and a third and a fourth PMI $i_{1V}$ and $i_{1H}$, wherein the indices m, m' and n are employed to select the precoding matrix, wherein the selected precoding matrix includes a first column comprising a first row partition and a second row partition, wherein the first row partition is a Kronecker product of at least first and second precoding vectors $v_m$ and $v_{m'}$ and the second row partition is a Kronecker product of a first term and a second term, wherein the first term is a product of a co-phasing factor $\phi_n$ and the first precoding vector $v_m$ and the second term is the second precoding vector $v_{m'}$, and wherein the first precoding vector $v_m$ is selected from a first codebook and the second precoding vector $v_{m'}$ is selected from a second codebook.

20. The method according to claim 19, wherein the report of the CQI and the PMI is made on a PUCCH and wherein a report prior to the report on the PUCCH includes the third and the fourth PMI $i_{1V}$ and $i_{1H}$.

* * * * *